United States Patent
Zhao et al.

(10) Patent No.: US 9,451,043 B2
(45) Date of Patent: Sep. 20, 2016

(54) REMOTE VIRTUALIZATION OF MOBILE APPS

(71) Applicant: Curious Olive, Inc., Mountain View, CA (US)

(72) Inventors: David Zhao, Mountain View, CA (US); Yu Qing Cheng, San Jose, CA (US); Russ D'Sa, Saratoga, CA (US); David Schwartz, San Mateo, CA (US)

(73) Assignee: EVIE LABS, INC., Palo Alto, CA (US)

(*) Notice: Subject to any disclaimer, the term of this patent is extended or adjusted under 35 U.S.C. 154(b) by 214 days.

(21) Appl. No.: 14/026,966

(22) Filed: Sep. 13, 2013

(65) Prior Publication Data

US 2015/0081764 A1    Mar. 19, 2015

(51) Int. Cl.
| | |
|---|---|
| G06F 15/16 | (2006.01) |
| H04L 29/08 | (2006.01) |
| G06F 9/54 | (2006.01) |
| G06F 9/44 | (2006.01) |
| G06F 3/048 | (2013.01) |
| H04N 21/81 | (2011.01) |
| G06F 9/455 | (2006.01) |

(52) U.S. Cl.
CPC ......... *H04L 67/2861* (2013.01); *G06F 9/4445* (2013.01); *G06F 9/542* (2013.01); *H04L 67/08* (2013.01); *G06F 3/048* (2013.01); *G06F 9/45533* (2013.01); *G06F 2209/545* (2013.01); *G06F 2209/549* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 8,560,331 B1* | 10/2013 | Pereira | ................. | H04N 21/431 704/503 |
| 2002/0032751 A1* | 3/2002 | Bharadwaj | ............. | H04L 29/06 709/218 |
| 2007/0240155 A1* | 10/2007 | Shlomai | ............. | G06F 9/44584 717/174 |
| 2009/0210487 A1* | 8/2009 | Westerhoff | ............ | G06T 15/005 709/203 |
| 2012/0102549 A1* | 4/2012 | Mazzaferri | ......... | G06F 21/6218 726/4 |
| 2012/0284322 A1* | 11/2012 | Laborczfalvi | ......... | H04W 4/021 709/202 |
| 2012/0311457 A1* | 12/2012 | O'Gorman | ............. | G06F 3/048 715/740 |
| 2013/0166622 A1* | 6/2013 | Arunachalam | ....... | G06F 9/5027 709/202 |
| 2013/0246932 A1* | 9/2013 | Zaveri | ..................... | G06F 3/017 715/740 |
| 2014/0068007 A1* | 3/2014 | O'Gorman | ............. | H04N 7/147 709/219 |
| 2014/0179439 A1* | 6/2014 | Miura | ..................... | A63F 13/12 463/42 |

* cited by examiner

*Primary Examiner* — Viet Vu
*Assistant Examiner* — James Edwards
(74) *Attorney, Agent, or Firm* — Michael K. Bosworth; IPxLaw Group LLP

(57) ABSTRACT

The present invention includes various embodiments of a mobile app remote virtualization system and process that enables users of remote client devices to control mobile apps running in a host server environment. The resulting user experience is practically equivalent to running native mobile apps, even when such mobile apps require access to local client device resources, as well as when native versions of such mobile apps do not exist for the user's client device. The functionality afforded by the mobile app remote virtualization system and process of the present invention enables a variety of novel scenarios and "use cases" that have not previously been available to mobile device users.

38 Claims, 19 Drawing Sheets

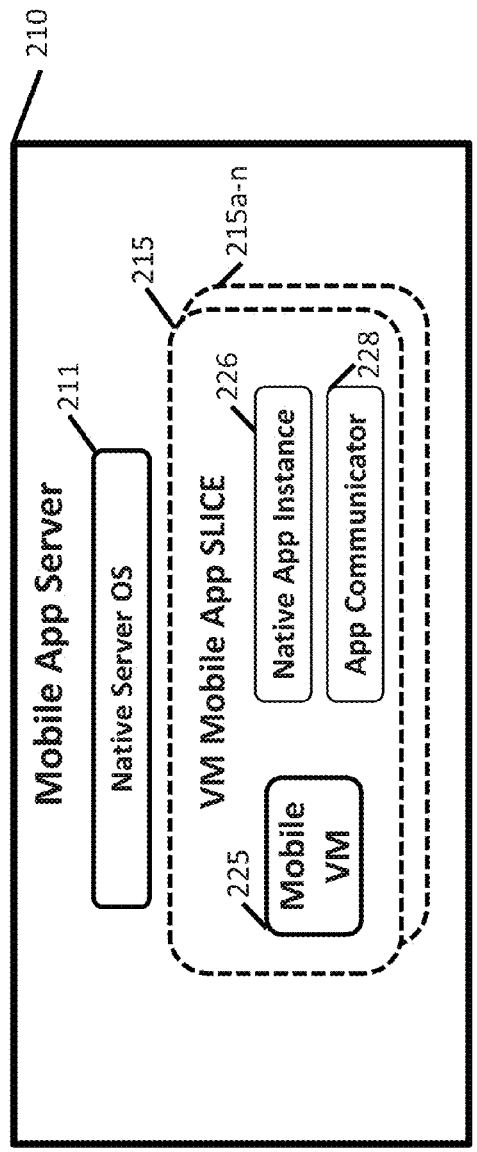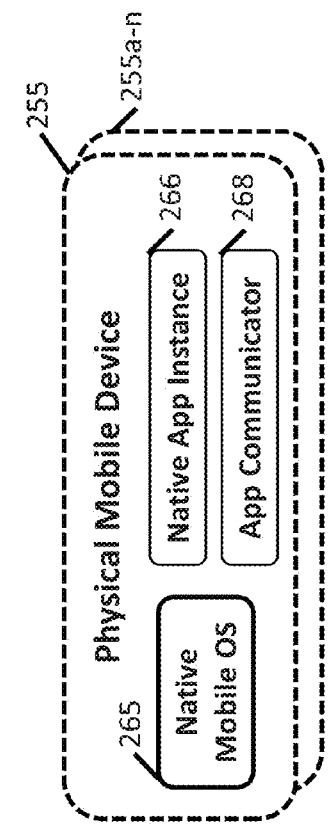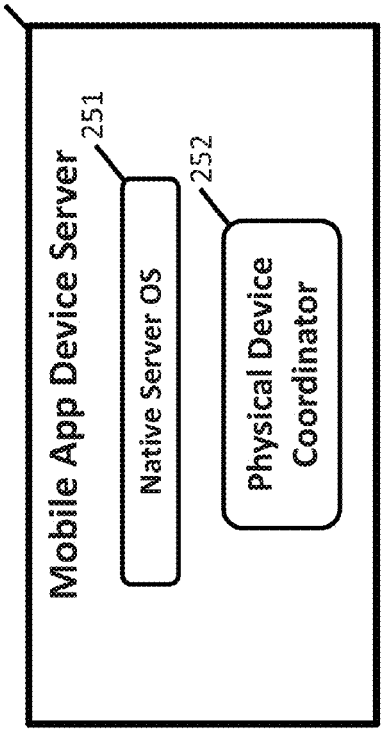
FIG 2A
FIG 2B

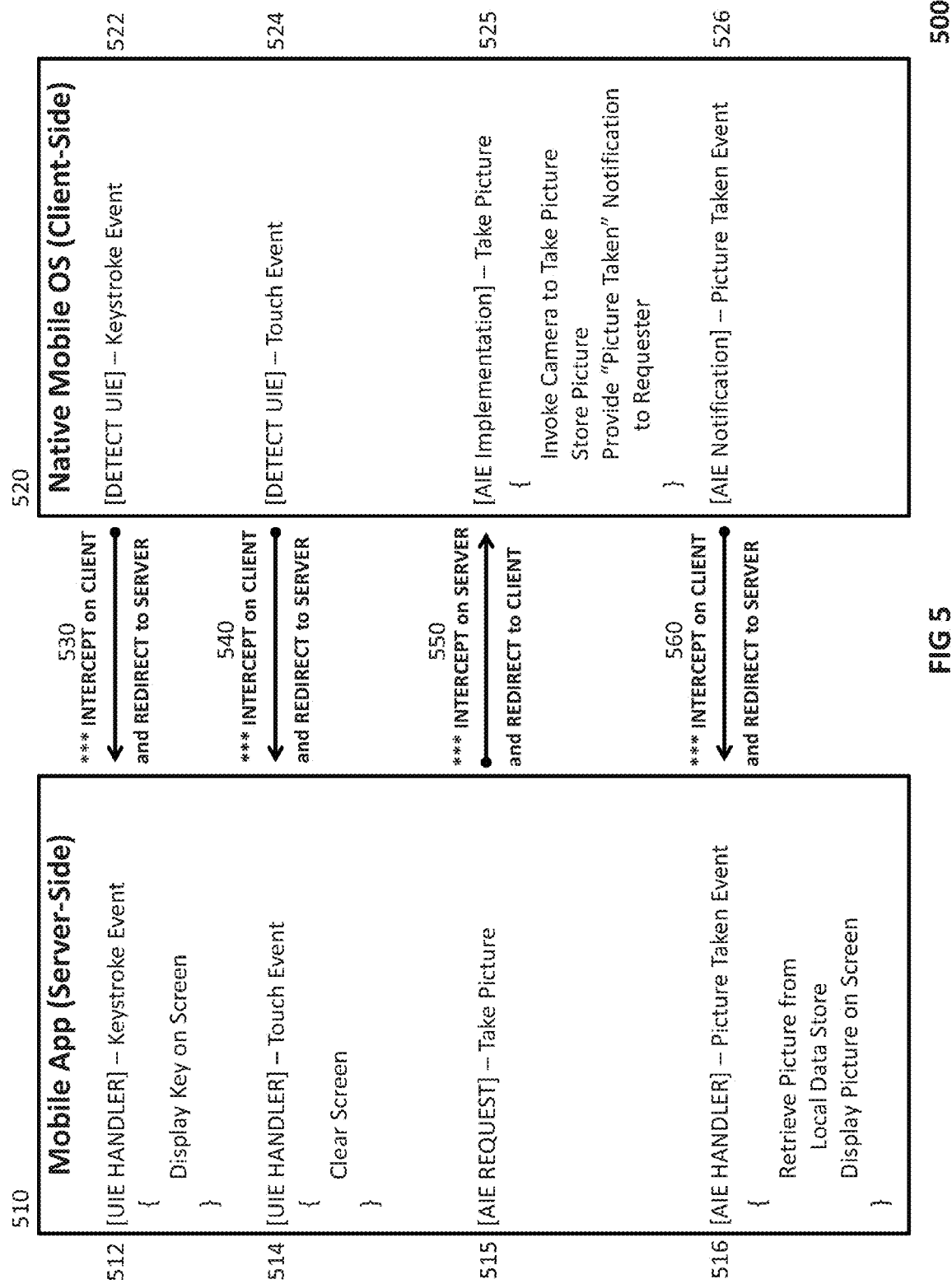

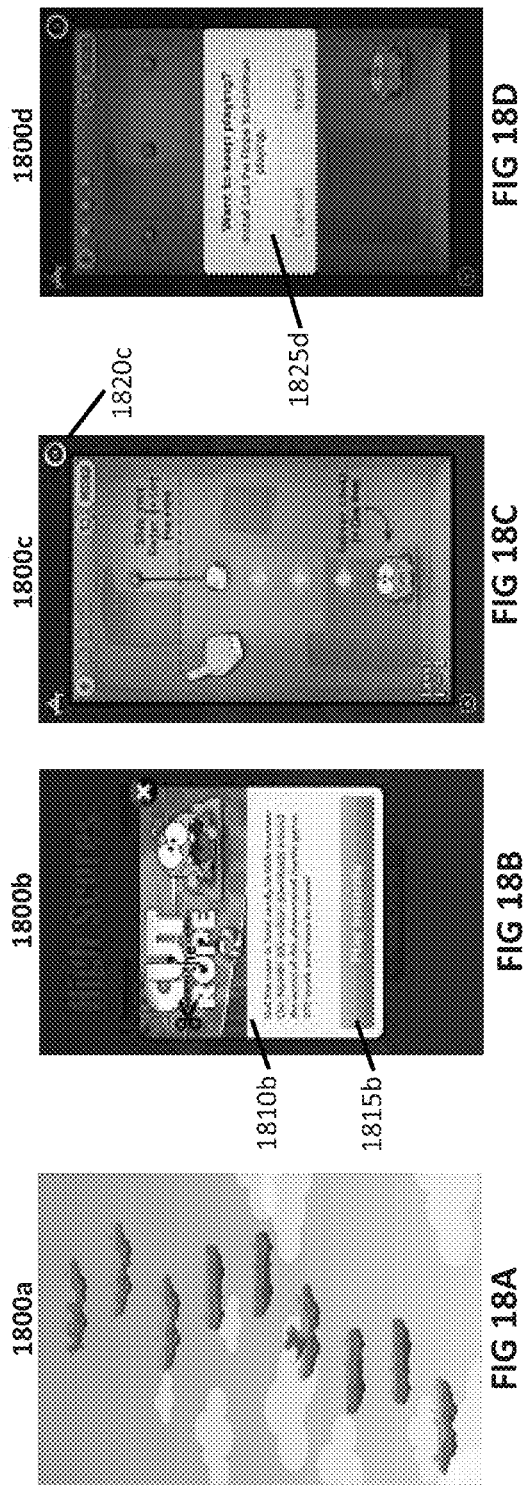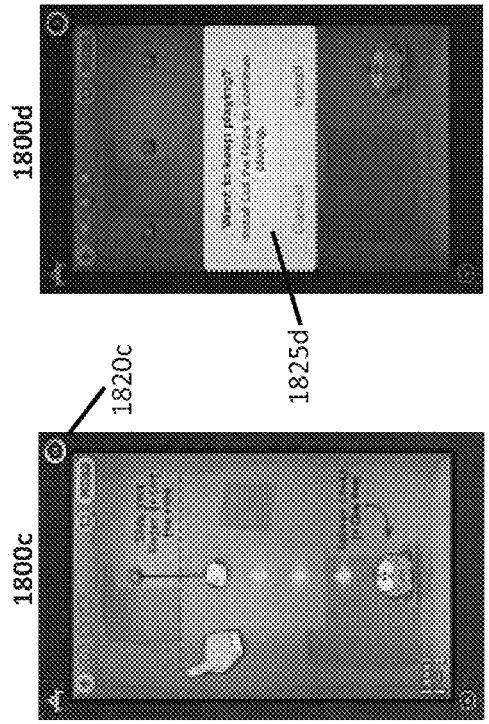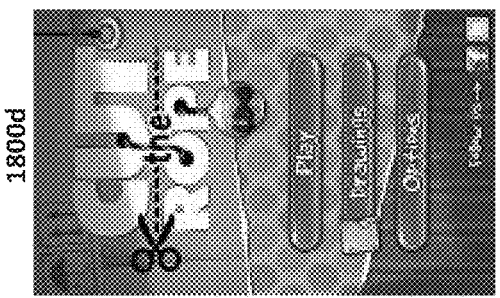

REMOTE VIRTUALIZATION OF MOBILE APPS

BACKGROUND

1. Field of Art

The present invention relates generally to the field of virtualization, and more particularly to virtualization of mobile apps running on distant computing platforms.

2. Description of Related Art

As computing systems have evolved, so too has the need to mimic the functionality of computer hardware, operating systems, applications and other computing resources. For example, computer simulations of natural systems (travel in outer space, city traffic patterns, etc) are often employed to model and predict the behavior of such systems under varying conditions. Computer emulators have been developed to avoid the obsolescence of older computer platforms by duplicating their functionality on a modern platform (e.g., emulating an Atari game system on a general-purpose personal computer to enable users to continue to play games written for the older platform). Hardware and software components of computer systems under development can also be emulated to assess their behavior in a system environment. Moreover, "virtual machines" have been developed to mimic the behavior of a "guest" platform (e.g., the Microsoft Windows operating system and applications, as well as hardware peripherals) on a "host" platform (e.g., Macintosh computer).

Though terms such as "simulation," "emulation" and "virtualization" are often used inconsistently and in various different contexts, the need to mimic the functionality of particular computing resources remains a constant thread. For the purposes of this specification, these terms can be considered interchangeable in this context.

Moreover, the physical form in which such functionality is implemented can vary from dedicated computer hardware to software running on a general-purpose computer to a myriad of hybrid implementations allocating such functionality among hardware and software components. It should be noted that even software components are typically embodied in physical non-transitory storage media (i.e., memory), such as hard disk drives, flash memory, etc.

One form of virtualization, sometimes referred to as "remote" virtualization, involves the interaction of two computing environments—a host server environment in which the actual computing resources to be virtualized reside, and a remote guest/client device environment from which these resources are controlled. In this context, one can say that the "virtual" resources reside on the client device, while the actual resources reside in the host environment (though the host might also include additional virtual resources, such as virtual machines).

Remote desktop virtualization software (PC Anywhere, VNC software, etc) enables users to remotely control applications (running, e.g., on their desktop computers) from a client device at a remote location (e.g., a smartphone or laptop in a hotel room). Such software enables a user from a remote location to input events (e.g., keystrokes and touch events) into a smartphone, and see the results of such interactions (e.g., screen displays) on the smartphone, while the applications being controlled might actually reside and execute on a host computer at the user's home or business. Other "cloud-based" remote virtualization systems (OnLive, CloudOn, GaiKai, etc) offer similar functionality to remotely control particular applications, such as office suites and games designed to run on desktop computers, gaming platforms, etc.

Thus, remote virtualization enables users to access, from a remote location, computing resources that, for a variety of reasons, are not otherwise available at the remote location. With the advent of smartphones and mobile "apps" (e.g., applications designed for mobile devices), users now have the ability to take their mobile apps with them to essentially any location. Why then would a smartphone user need a "virtual mobile app?"

There are a number of answers to that question, which explain the relatively recent influx of purported solutions to the "virtual mobile app" problem. One aspect of this problem is the existence of multiple mobile platforms (iPhone, Android, etc), and the lack of availability of certain mobile apps on particular mobile platforms (e.g., an iPhone app that is not available on Android smartphones). Another problem is the obstacle of downloading and installing a mobile app, which might appear to be a minor inconvenience on the surface, but which has been shown to be a significant hurdle in practice. For example, a user desiring to try a calculator app might want to demo 5 different apps for a few minutes each before selecting the most desired one. But, some apps may not offer free "trial" versions, while other apps may require more time to download and install than to demo.

Thus, there exists a need for a "virtual mobile app" that can be invoked from a user's smartphone, and provide the user experience of a native mobile app, but without ever requiring that the mobile app be downloaded and installed on the user's smartphone. A few companies (e.g., Piecable, acquired by Facebook, and Kickfolio) have recently attempted to address this problem by enabling smartphone users to demo mobile apps via their mobile web browser (with Piecable using Flash and Kickfolio using HTML5). Other companies, such as Agawi (e.g., Agawi's AppGlimpse mobile advertising platform and US Pat. App. No. 2013/0013671), have sought to move into the virtual mobile app space by enabling users to demo virtual mobile apps as "advertisements" invoked from a native mobile app.

What these existing "solutions" fail to address, however, is the need to mimic the complete user experience, as if the user was running a native mobile app instead of a virtual mobile app. Merely capturing user input events and displaying resulting screen displays is insufficient. For example, mobile apps may also have a need to access certain local resources available only in the native environment of the user's smartphone, and not on a distant host server. Such resources might include, among others, a smartphone's local data store (e.g., data shared among mobile apps or available to the mobile app currently being executed), its current location (as determined via local GPS hardware on the smartphone) and its surrounding environment (as captured by a camera on the smartphone).

While the Agawi patent application referenced above briefly alludes to this problem, it does not provide or suggest a workable solution that would resolve this problem:

"To achieve a seamless user experience, the data specific to mobile devices 124 are also captured in the mobile device and sent through the control channel to the control server 220. This data may include the device orientation, GPS location, gyro/accelerometer data, and the like."

[US Pat App No 2013/0013671, last 2 sentences of Paragraph 0072].

For example, if a virtual mobile app simply captured GPS data and passed it to the control server 220, how would that data be passed to the "native" mobile app running on the server? Moreover, it would be terribly inefficient to capture GPS data without any knowledge of when/whether the mobile app required that data. One of the cited examples, device orientation, could be passed to the control server 220 in the same manner as other "local input events," because mobile devices typically include a mechanism for "pushing" all such events to mobile apps.

But, the other cited examples (GPS location and gyro/accelerometer data), and many others not mentioned in Agawi (such as local data, cameras, microphones, speakers, network devices, etc) do not fall into the category of "user-initiated" events that are automatically "pushed" to mobile apps without the necessity of a runtime request (even if a mobile app can opt out or ignore such events). Instead, such "app-initiated" events are defined at runtime at the request of the mobile app itself. For example, a mobile app might, at a certain point during its execution, request that the smartphone's camera take a picture, that its GPS hardware notify the mobile app when the smartphone's location changes by a certain threshold, or that it initiate a network request via the smartphone's WiFi or Bluetooth hardware.

Examples of user-initiated events include keystrokes (from a physical keyboard or "soft" keypresses on a touch-screen), touch events and device orientation. While a mobile app is running, the mobile OS (operating system) in a mobile device automatically notifies the mobile app when such user-initiated events occur. The native code of the mobile app typically includes "handlers" to respond to such events.

Mobile devices do not, however, automatically notify mobile apps whenever the device's location changes (as detected by its GPS or gyro/accelerometer hardware), or whenever sound is detected by the device's microphone or an image is detected by one of the device's cameras. Such a mechanism (alluded to by Agawi above) would be terribly inefficient and would significantly drain the device's battery.

Instead, a mobile app must define such app-initiated events by making an explicit runtime request (typically to the mobile OS) for the device to detect a particular change in location, to capture sound or take a picture. In response to such runtime requests, the mobile OS then notifies the mobile app when the app-initiated event has occurred, providing a mechanism to retrieve any resulting data (location coordinates, sound samples, images, etc.). Though a mobile app would still include a "handler" to respond to such app-initiated events, it is important to distinguish these app-initiated events (that are defined by runtime requests from a mobile app) from user-initiated events (that are automatically provided to a mobile app).

In the context of a virtual mobile app, app-initiated events that require local client resources must be handled very differently from user-initiated events, because a mobile app running on a distant host server does not have direct access to a mobile device's local resources (local data store, GPS chip, accelerometer, cameras, microphones, speakers, WiFi and Bluetooth network devices, etc).

Unlike a mobile operating system that can be simulated on a host server and accessed by a mobile app, a mobile device's local resources cannot be simulated on a distant host server in the same manner. For example, if a mobile app running on a distant host server requests that the mobile device take a picture with its camera, how would the simulated mobile operating system on the host server successfully complete that request when it does not have access to that camera?

What is needed is a mobile app remote virtualization system and process that addresses this problem in a manner that is transparent to the mobile app, which "thinks" it is running on a client mobile device. Any solution must successfully handle (in addition to user-initiated events) app-initiated events (also referred to herein as application-initiated events) triggered by the mobile app running in a host server environment by somehow coordinating with the client mobile device which has access to the requested local resources.

SUMMARY

To address the above-referenced problems, the present invention includes various embodiments of a mobile app remote virtualization system and process that enables users of remote client devices to control mobile apps running in a host server environment. The resulting user experience is practically equivalent to running native mobile apps, even when such mobile apps require access to local client device resources, as well as when native versions of such mobile apps do not exist for the user's client device.

A host SERVER Environment includes a Mobile App Server for running instances of mobile apps and a Coordinator for managing the initiation of virtual mobile app sessions with client mobile devices. In one embodiment, the Mobile App Server includes virtual machines to execute mobile apps on a mobile OS simulator, while in another embodiment physical mobile devices are employed to execute mobile apps in their native environment. Hybrid combinations of these embodiments may also be employed without departing from the spirit of the present invention.

An App Communicator is employed to facilitate the generation and streaming of screen displays to remote client mobile devices with minimal latency to provide a user experience that is practically equivalent to running native mobile apps. The App Communicator also includes a User Input and Sensory Data Event Handler for processing events from client devices, including both user-initiated events (e.g., keystroke and touch events, as well as device orientation), that are automatically "pushed" to mobile apps without the necessity of a runtime request, and app-initiated events (e.g., taking a picture or capturing sound), that are defined by runtime requests from mobile apps and require the use of local mobile device resources.

A Remote API Listener/Dispatcher addresses situations in which local mobile device resources are required by the mobile app being executed in the host SERVER Environment. For example, it intercepts requests defining app-initiated events that require access to local device resources, such as local data, GPS and accelerometer sensors, cameras, microphones, speakers, WiFi and Bluetooth network devices, etc. Such requests for app-initiated events are transmitted to and implemented on the remote mobile device (e.g., by the "virtual app").

Similarly, the Remote API Listener/Dispatcher intercepts requests by a mobile app that invoke (and thus require access to) another mobile app which must run "concurrently" on the remote mobile device. Here too, such requests must be intercepted and delivered to the remote mobile device to be implemented. In one embodiment, an alternative server-side app is executed (if available) to fulfill requests that cannot be handled by the remote mobile device.

To achieve graphics performance equivalent to the graphics processing units (GPUs) found in many of today's mobile devices, a Specialized Graphics Listener/Dispatcher intercepts OpenGL and other calls intended to be processed by "local" GPU hardware, and forwards them to a GPU Rendering Server that handles such calls more efficiently than would a typical "CPU-centric" server.

The host SERVER Environment communicates with a remote device CLIENT Environment that includes a Virtual App SDK (also referred to herein as the "virtual app") that can be embedded in other native mobile apps as well as in a standalone "shell app" that serves as a "container" for one or more virtual mobile apps. Moreover, the Virtual App SDK can also be embedded in another SDK (e.g., for implementing mobile advertisements) that is often itself embedded within a native mobile app. In yet another embodiment, the Virtual App SDK is implemented in HTML5, rather than in native code for the client device. In this embodiment, the Virtual App SDK can be delivered to the remote client device via a distant web server.

The Virtual App SDK includes a Rendering & Playback Engine for rendering screen displays generated by the mobile app running in the host SERVER Environment, and a Network Monitoring Engine to minimize audio glitches and video artifacts. The Virtual App SDK also includes a User Input and Sensory Data Capture Engine for capturing user-initiated events as well as sensory and other local data required by app-initiated events.

A Remote API Invocation handler receives and implements app-initiated events intercepted from the mobile app running in the host SERVER Environment in order to provide access to local mobile device resources, with resulting data transmitted back to the mobile app running in the host SERVER Environment. Similarly, the Remote Notification/Inter-App Event Handler implements intercepted requests that require invoking other mobile apps (if available) "concurrently" on the mobile device and transmitting any resulting data back to the mobile app running in the host SERVER Environment. In one embodiment, the Remote Notification/Inter-App Event Handler also intercepts requests for invoking other mobile apps that originate on the client device.

The functionality afforded by the mobile app remote virtualization system and process of the present invention enables a variety of novel scenarios and "use cases" that have not previously been available to mobile device users. For example, mobile advertisements can now be made far more interactive, and can include the full functionality offered by a native mobile app (including access to local device resources), even one that is not available on the user's mobile device platform.

Similarly, a user can effectively run a "trial" version of a mobile app without ever having to download that app. This "trial" capability may result in far more eventual mobile app downloads than would be the case if the user were first required to download a trial version. Variations on this theme include "market testing" a new mobile app or new features of an existing mobile app, "A-B Testing" of alternative versions with different features (e.g., with different versions available to different groups of users), "Beta Testing" a nearly completed mobile app, and temporarily providing access to a mobile app while it is being ported to a user's client device platform.

A mobile app distribution entity, such as Apple's iOS "App Store," could now offer trial versions of virtually any mobile app, perhaps imposing certain limitations (e.g., a 30-second demo of a mobile app) to enable users to "try before you buy" (analogous to Apple's iTunes Store which offers short clips of songs).

Commercial transactions (e.g., purchasing flowers) can now be completed without the necessity of ever downloading the mobile app. Companies concerned about security no longer need to install intrusive mobile device management (MDM) software on their employees' personal mobile devices. They can instead provide "virtual company apps" that store data on a secure company server, and can be virtually "removed" (e.g., in the event of a lost mobile phone or a terminated employee) via a server-based authentication mechanism.

Alternative devices, such as televisions, can be enabled with the ability to run mobile apps, despite the absence of a mobile operating system (e.g., via a web browser). In addition to these "alternative screens," multiple screens can be enabled to run a mobile app simultaneously (e.g., both an iPad and an Android phone running the same instance of a mobile app, even if the mobile app is not natively available for some or all of these platforms). In another embodiment, the "state" of a session can be restored across different client devices, enabling a user to restore a virtual app session from a different device.

A mobile app "deep link" feature enables a user to link to a particular place in a virtual app (e.g., based on a link from a website), despite not having installed the mobile app natively. A "fast forward" feature enable a user to immediately jump to a particular part of a mobile app, due to the ability to simulate events in the host SERVER Environment on which the mobile app is running. Similarly, a mobile app could also perform functionality equivalent to a "deep link" to a particular part of a website.

Many other embodiments and applications of the present invention will be apparent to those skilled in the art in light of the functionality described herein, including but not limited to hybrid hardware and/or software implementations of the functionality described herein, different server-side and client-side consumer electronics and other devices, and numerous scenarios which avoid the requirement that users download and install native mobile apps. Moreover, it will be readily apparent to one skilled in the art that the principles disclosed herein can be applied to "apps" (or applications, even if not designed for mobile platforms) running on practically any computer platform, mobile or otherwise, without departing from the spirit of the present invention.

BRIEF DESCRIPTION OF DRAWINGS

FIG. 2A is a block diagram of one embodiment of a server-side architecture of the present invention, in which mobile apps run in a Mobile VM;

FIG. 2B is a block diagram of an alternative embodiment of a server-side architecture of the present invention, in which mobile apps run in a Physical Mobile Device;

FIG. 5 is a diagram illustrating sample pseudo-code for methods of handling user-initiated events and app-initiated events in an embodiment of the present invention.

FIGS. 15A-15B are annotated screenshots of embodiments of various use-case scenarios of the present invention.

FIGS. 18A-18E are annotated screenshots of embodiments of various use-case scenarios of the present invention.

DETAILED DESCRIPTION

In accordance with the present invention, various embodiments of a novel architecture and methods are disclosed for a mobile app remote virtualization system that enables users of remote client devices to control mobile apps running in a host server environment, while providing a user experience that is practically equivalent to running native mobile apps, even when such mobile apps require access to local client device resources, as well as when native versions of such mobile apps do not exist for the user's client device.

Standard hardware peripherals can be inferred where not illustrated, including CPUs, memory, keyboards, mice, touchscreens, networking hardware and common device sensors. Moreover, it will be apparent to one skilled in the art that the functional components described herein can be embodied in a myriad of different combinations of hardware and software without departing from the spirit of the present invention. Functionality embodied in one physical device can be distributed among multiple physical devices and, conversely, functionality embodied in multiple physical devices can be combined into a single physical device. Moreover, software functionality disclosed herein can be implemented in hardware and, in any event, is embodied in physical storage devices (memory) including non-transitory computer-readable media.

In particular, computer servers and client devices described herein can run server, desktop, laptop and other portable device operating systems, as well as virtual machines containing mobile OS (and other) simulators. Such servers and client devices can also be implemented in tablets, phones and other mobile devices and gaming platforms, as well as in televisions and other consumer electronic devices. Various native and simulated operating systems can be employed, including Unix, Linux, Windows, Mac OS, iOS, Android, etc. Client SDK functionality can be embedded in native mobile apps (and in another SDK such as a mobile advertising SDK), in standalone apps (including a "shell app" container including multiple virtual apps), in HTML web pages, and in practically any other client device described above.

Moreover, use case scenarios for the mobile app remote virtualization system of the present invention can take numerous forms without departing from the spirit of the present invention, including variations of the use cases described herein that avoid (if only temporarily) the downloading and installation of native versions of a virtual app on the client device.

Figure 1:
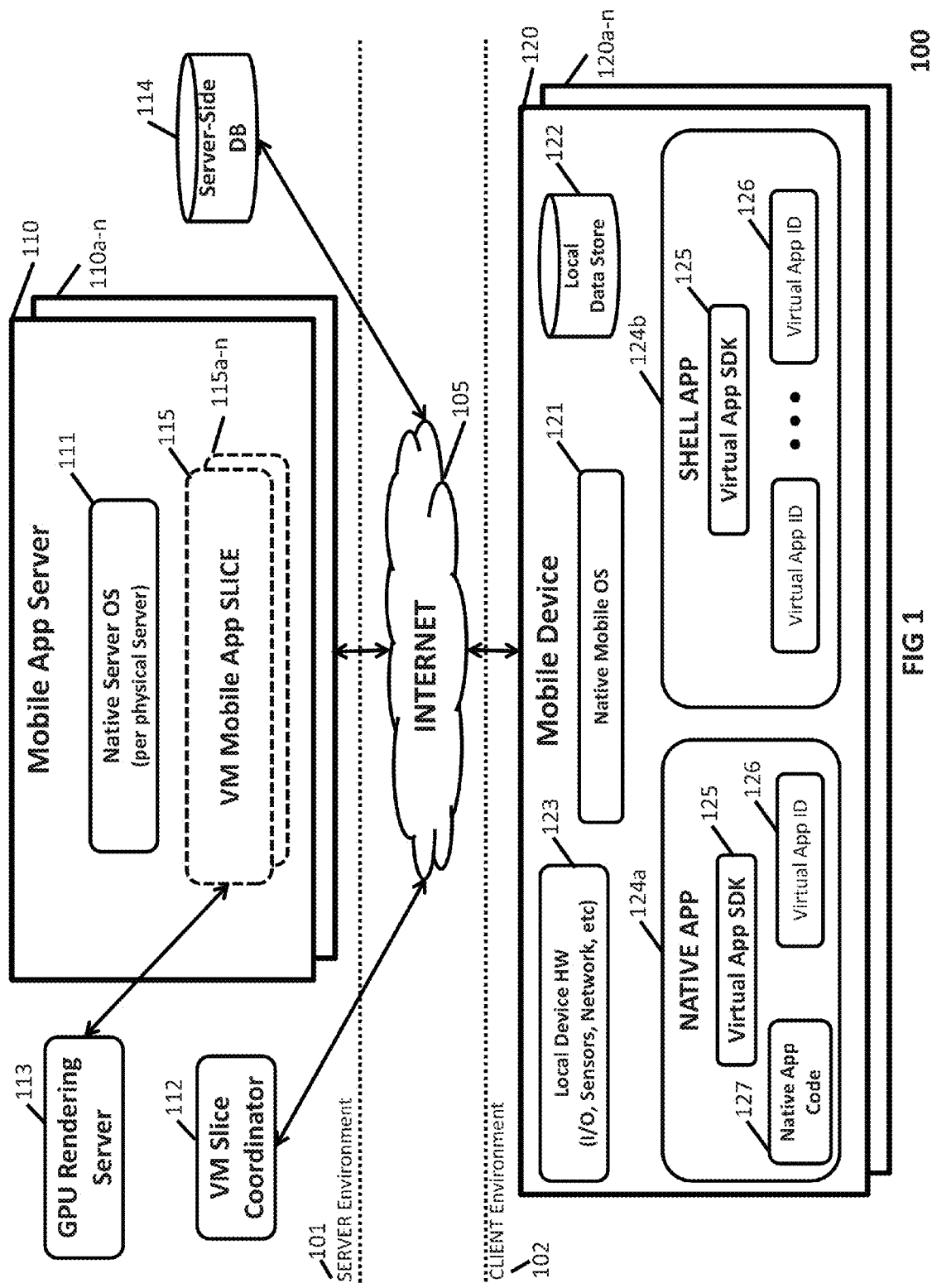
FIG. 1 is a block diagram of a system architecture of one embodiment of the present invention.

FIG. 1 is a block diagram of a system architecture of one embodiment of the present invention. Mobile app remote virtualization system 100 includes a SERVER Environment 101 that communicates with a CLIENT Environment 102 over a network, in this case the Internet 105. A mobile app is virtualized by running in SERVER Environment 101, while being controlled from and virtually present in CLIENT Environment 102. In this regard, a "virtual app" can be said to be present in CLIENT Environment 102, though actually running in SERVER Environment 101.

CLIENT Environment 102 includes one or more Mobile Devices 120a-n. System 100 typically includes multiple instances of multiple different mobile apps running concurrently in SERVER Environment 101, though each mobile app "session" typically involves a single instance of a mobile app running in SERVER Environment 101 and being controlled from a single virtual app running on a single Mobile Device 120.

In other embodiments, a single session could involve variations in which multiple mobile apps are running in SERVER Environment 101 and being controlled by multiple virtual apps present in one or more Mobile Devices 120a-n. For example, a multi-player game mobile app might be implemented with a single native mobile app running in SERVER Environment 101 and managing a session involving multiple users, each running the virtual app from their own Mobile Device 120.

Mobile Device 120, in the embodiment illustrated in FIG. 1, could be a smartphone running a Native Mobile OS 121 (e.g., iOS or Android). In other embodiments, Mobile Device 120 could be a tablet (e.g., an iPad), a netbook or laptop computer (even one running a traditional "desktop" operating system), or practically any other device capable of network communication, even if not technically "mobile." Note that a Native Mobile OS 121 is even optional. For example, a user's television that is otherwise incapable of running native apps could run a "dedicated" virtual app (e.g., a "web app" delivered over Internet 105 to the television's web browser) which provides access to the television's local resources while enabling the user to provide inputs to and display the outputs of the "native" app running in SERVER Environment 101.

Returning to the embodiment illustrated in FIG. 1, Mobile Device 120 includes various local resources that are made accessible to SERVER Environment 101, including Local Data Store 122 (typically flash or hard disk memory for storing data accessible to some or all of the native mobile apps on Mobile Device 120) and Local Device HW 123, which can include, among other hardware, a physical keypad for keystroke entry, a smartphone touchscreen to record touch and "soft" keystroke events, network hardware (e.g., Bluetooth, WiFi, NFC and 3G/4G/LTE cellular components), microphones, speakers, and cameras, as well as various sensors for device orientation, location (e.g., GPS), movement (e.g., gyroscope and accelerometer), authentication (fingerprint and retina sensors) and a variety of other sensors constantly being added to mobile devices. As will be discussed in greater detail below, these local resources can be accessed indirectly by a mobile app running in SERVER Environment 101 (i.e., with the assistance of the corresponding virtual app running in CLIENT Environment 102).

In one embodiment, a virtual app can be embedded in a NATIVE APP 124*a* on Mobile Device 120, in which case the Native App Code 127 is combined with Virtual App SDK 125 and a Virtual App ID 126 (to uniquely identify the virtual app and optionally associate it with Mobile Device 120). In this embodiment, the virtual app is essentially the combination of Virtual App SDK 125 and Virtual App ID 126 (though Virtual App SDK 125 is referred to herein as the "virtual app"). In other embodiments (not shown), multiple Virtual App IDs 126 could be employed to enable a single NATIVE APP 124*a* to invoke multiple different virtual apps (which could share a single Virtual App SDK 125). The functionality of Virtual App SDK 125 is explained in greater detail below with reference to FIG. 6.

In any event, while running NATIVE APP 124*a*, a user might, for example, encounter a link to an interactive advertisement for another app (i.e., the virtual app). Rather than merely view a typical advertisement, the user is provided with a far more interactive experience, effectively running the virtual app as if it were natively present on Mobile Device 120 (even when native execution might be impossible because, for example, the app is still under development or has not yet been ported to Native Mobile OS 121). Because the advertised mobile app is actually running in SERVER Environment 101, it can easily be constrained, for example, to a 30-second demo or otherwise modified for various marketing or other purposes.

In another embodiment also illustrated in FIG. 1, one or more virtual apps can be embedded within a standalone SHELL APP 124*b*, which is effectively a container for one or more Virtual App IDs 126 that share a single Virtual App SDK 125. In this embodiment, each unique Virtual App ID 126, paired with the shared Virtual App SDK 125, can be considered a distinct virtual app. A user could thus manually launch SHELL APP 124*b*, and select any of these virtual apps in the same manner as the user would launch any native app installed on Mobile Device 120. Here too, these virtual apps might be constrained or otherwise modified for various marketing or other purposes—such as a limited demo period to encourage the user ultimately to purchase, download and install the native version of the app on Mobile Device 120.

Turning to SERVER Environment 101, it should be noted that the functional components of SERVER Environment 101 can be distributed among one or more physical computers, depending upon the design requirements, without departing from the spirit of the invention. As will be discussed below, these functional components can even be distributed among other physical devices, including mobile devices and video game consoles.

In any event, one or more Mobile App Servers 110*a-n* are employed to execute the native mobile apps corresponding to the virtual apps in CLIENT Environment 102. In other words, when a user launches a virtual app from CLIENT Environment 102, the actual corresponding native mobile app is launched in a Mobile App Server 110, which includes, on each physical server computer, a Native Server OS 111 (e.g., UNIX, Windows or MAC OS, among other operating systems), and one or more VM Mobile App SLICEs 115*a-n* in which the native mobile apps are executed. As will be discussed in greater detail below with reference to FIGS. 2*a-b* and 3, VM Slice Coordinator 112 is employed to select and manage the various VM Mobile App SLICEs 115*a-n* in which native mobile apps are executed.

Each VM Mobile App SLICE 115 represents, in this embodiment, a "session" in which an instance of a native mobile app is executed. It should be noted that, in one embodiment, "Session IDs" (not shown) are generated to identify each session in which a particular virtual app is launched from a particular Mobile Device 120. Sessions can be resumed and, in some embodiments, will "time out" after a certain period of time has elapsed. Session IDs are stored in Server-Side DB 114, though in other embodiments they can be stored in Local Data Store 122 or even generated in "real time" on a remote website. In yet other embodiments, Session IDs are optional in some or all situations to facilitate "anonymous" sessions.

In one embodiment, to execute native mobile apps, virtual machines are employed, as explained in greater detail below with reference to FIG. 2*a*. For example, a native iOS mobile app is executed on an iOS simulator, whereas a native Android mobile app is executed on an Android OS simulator.

In an alternative embodiment, discussed below with reference to FIG. 2*b*, physical mobile devices (e.g., iOS and Android tablets and phones, video game consoles, etc.) are employed in lieu of virtual machines. In either case, however, the central concept remains the same. Native mobile apps are executed in SERVER Environment 101 in coordination with virtual apps running on remote mobile devices in CLIENT Environment 102.

This coordination is facilitated in one embodiment by communications between an App Communicator (228 in FIG. 2*a* or 268 in FIG. 2*b*) in SERVER Environment 101 and Virtual App SDK 125 in CLIENT Environment 102. The details of this coordination are discussed in greater detail below with reference to FIGS. 4-9. Yet, it should be noted that, because a native mobile app is executed in SERVER Environment 101 while its corresponding virtual app resides on a remote Mobile Device 120 in CLIENT Environment 102, it is possible for a native iOS mobile app to be controlled by a remote Android device (and vice-versa). In other words, mobile devices can (virtually) run mobile apps that are otherwise incompatible with the device's native mobile OS, even when such mobile apps require access to local client device resources.

Native Mobile OS 121 provides native mobile apps with access to Local Device HW 123 and Local Data Store 122. To enable mobile apps running in SERVER Environment 101 to access these local client device resources, special functionality is required, which is summarized here briefly, and explained in greater detail below with reference to FIGS. 4-9).

Server-Side DB 114 is employed, in connection with Mobile VM 225 (FIG. 2*a*), to handle local data that a native mobile app would typically store/retrieve directly using Local Data Store 122. Virtual machines running mobile OS simulators already address this problem by utilizing memory on the VM itself to store/retrieve such local data accessed by a mobile app during a session. As will be explained in greater detail below with reference to FIG. 3, this local data (along with other session-related data) is stored in Server-Side DB 114 at the end of each session, and retrieved when the session is resumed.

Data resulting from user-initiated events (e.g., identifying a user's keypress or button touch) are provided automatically by Native Mobile OS 121, intercepted by Virtual App SDK 125 and transmitted to SERVER Environment 101 for processing.

As noted above, however, data resulting from app-initiated events cannot be handled in this manner because they are not provided automatically by Native Mobile OS 121. Such data are instead generated (and subsequently provided by Native Mobile OS 121) only in response to a runtime request from a mobile app, which in this virtual scenario is running in SERVER Environment 101. So, when a mobile app makes such a runtime request, it is intercepted in SERVER Environment 101 and passed to Virtual App SDK 125 for local processing (as explained in greater detail below with reference to FIGS. 4-9).

Data resulting from app-initiated events includes data provided by Native Mobile OS 121 in response to requests for access to local resources, such as GPS chips, accelerometers, cameras, microphones, speakers, WiFi and Bluetooth network devices, etc. Such data also includes local data resulting from invocation of another mobile app (also intercepted in SERVER Environment 101).

While Mobile App Server 110 is, one embodiment, a typical "CPU-centric" server, an additional GPU Rendering Server 113 is employed to accommodate the fact that many mobile devices include specialized GPU hardware. In this embodiment, Mobile App Server 110 handles a mobile app's "CPU-centric" workloads (program logic, database, networking, security, etc.) in order to leverage off-the-shelf "CPU-centric" hardware, such as that offered by many cloud hosting providers. GPU Rendering Server 113, on the other hand, handles a mobile app's GPU-centric workloads (graphics/UI effects, rendering 3D objects, shading, etc.) in order to achieve graphics performance equivalent to that provided by GPU hardware found in many mobile devices. As a result, cost savings can be achieved by utilizing, for example, a $300 high-end CPU/GPU to handle up to 50 concurrent sessions running in VM Mobile App Slices 115a-n. In other embodiments, multiple GPU Rendering Servers 113 can be employed as needed. The manner in which certain graphics calls are intercepted and forwarded to GPU Rendering Server 113 for processing is discussed in greater detail below with reference to FIG. 4b.

FIG. 2a is a block diagram of one embodiment of a server-side architecture 200a of the present invention, in which mobile apps run in a Mobile VM 225. In this embodiment, each Mobile App Server (110a-n from FIG. 1) corresponds to a single physical server (Mobile App Server 210), though in other embodiments the functionality of Mobile App Server 210 could be distributed among multiple physical servers.

Each Mobile App Server 210 includes a Native Server OS 211 and multiple VM Mobile App SLICEs 215a-n. As noted above, each VM Mobile App SLICE 215 represents a "session" in which an instance of a native mobile app (Native App Instance 226) is executed on a virtual machine or "VM" (Mobile VM 225), which includes, for example, a mobile OS simulator such as an iOS simulator or Android OS simulator (not shown). In one embodiment, Mobile App Server 210 is initially provisioned with a fixed number of VM Mobile App SLICES 215a-n, each containing a Mobile VM 225 for the same Mobile OS (e.g., for iOS, Android, etc.). In other embodiments, VM Mobile App SLICEs 215a-n can be generated dynamically across multiple physical servers, and different Mobile OS simulators can be deployed on a single physical server.

After a user launches a virtual app on a remote Mobile Device 120 (FIG. 1), Virtual App SDK 125 (FIG. 1) passes the launch request to VM Slice Coordinator 212, which ultimately selects an appropriate Mobile VM 225 to execute an instance of the corresponding native mobile app (as explained in greater detail below with reference to FIG. 3). Mobile VM 225 then executes Native App Instance 226 during a runtime session in Mobile App SLICE 215, while the corresponding virtual app (Virtual App SDK 125) runs in Mobile Device 120.

Mobile VM 225 includes a mobile OS simulator, such as an iOS or Android simulator. Native App Instance 226 includes the native code corresponding to the virtual app, though it is typically compiled for its native OS simulator (e.g., iOS simulator), rather than for deployment on the native physical device (e.g., iPad or iPhone). App Communicator 228 (described in greater detail below with reference to FIG. 4a) provides much of the functionality of the present invention, in coordination with Virtual App SDK 125 (FIG. 1), the details of which are discussed in greater detail below with reference to FIGS. 4-9.

Thus, in the VM-based architecture 200a illustrated in FIG. 2a, native mobile apps are executed in a virtual machine. In an alternative embodiment of a server-side architecture of the present invention (architecture 200b illustrated in FIG. 2b), mobile apps are executed in actual physical mobile devices (e.g., iOS or Android tablets or phones), instead of in virtual machines.

Combinations of these two embodiments are also possible, with some mobile apps executed in virtual machines, while others are executed in physical mobile devices. Dynamic switching between the two embodiments is also possible. Engineering tradeoffs may dictate the choice of embodiment, as physical mobile devices offer greater performance, but typically at a higher cost.

In this alternative embodiment 200b, after a user launches a virtual app on a remote Mobile Device 120 (FIG. 1), Virtual App SDK 125 (FIG. 1) passes the launch request to Mobile App Device Server 250, which contains a Native Server OS 251 (e.g., Linux, Windows, Mac OS, etc) and Physical Device Coordinator 252, which performs functions analogous to that of VM Slice Coordinator 212 in FIG. 2a. However, instead of selecting an appropriate Mobile VM 225, Physical Device Coordinator 252 selects an appropriate Physical Mobile Device 255 (from among Physical Mobile Devices 255a-n) to execute the corresponding native mobile app.

Once Physical Device Coordinator 252 has selected Physical Mobile Device 255 (which contains Native Mobile OS 265—e.g., iOS or Android OS), it launches Native App Instance 266. App Communicator 268 is also loaded on Physical Mobile Device 255, and performs functions analogous to App Communicator 228 in FIG. 2a.

It should be noted that certain limitations exist in this alternative architecture 200b, resulting primarily from the choice of Native Mobile OS 265. For example, iOS imposes greater restrictions on inter-app communication than does the Android OS. App Communicator 268 must communicate with Native App Instance 266, for example, to intercept requests for app-initiated events requiring local resources on the remote client mobile device which launched the corresponding virtual app. Yet, App Communicator 268 and Native App Instance 266 are both apps running on Physical Mobile Device 255. Moreover, App Communicator 268 must also communicate with Physical Device Coordinator 252.

One solution to this problem, if permitted, is to "jailbreak" or otherwise modify aspects of Native Mobile OS 265. If not permitted, another solution is to run App Communicator 268 on another physical server, rather than on Physical Mobile Device 255. In this manner, App Communicator 268 can communicate with Physical Mobile Device 255 (e.g., via a standard device interface, such as USB) to issue commands, install/uninstall applications and push/pull app data (e.g., analogously to how iTunes on a Mac or PC communicates with an iPhone or iPad).

The remainder of this specification will focus on the embodiment illustrated in FIG. 2a, though it will be readily apparent to one skilled in the art how to make the necessary changes to substitute this alternative embodiment in FIG. 2b where desired.

Figure 3:
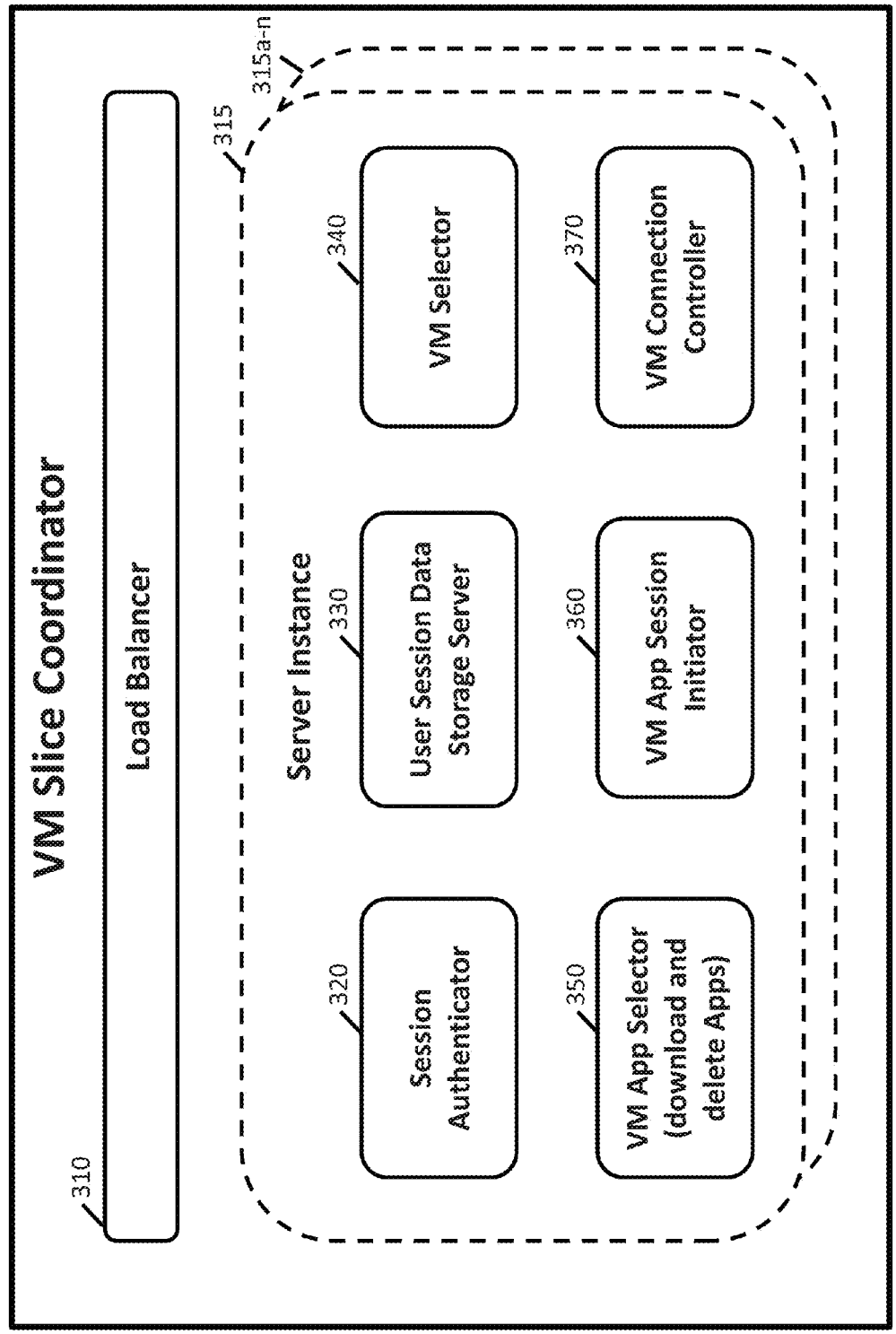
FIG. 3 is a more detailed block diagram of the VM Slice Coordinator illustrated in FIG. 1.

FIG. 3 is a more detailed block diagram of the VM Slice Coordinator illustrated in FIG. 1. VM Slice Coordinator 300 performs a variety of functions relating to the initiation and management of virtual app sessions. A more detailed discussion of an embodiment of the session-initiation process is provided below with reference to FIG. 7.

In the embodiment illustrated in FIG. 1, multiple Server Instances 315a-n are deployed in a standard fashion for load balancing purposes (as an enterprise hosting a large website might, for example, balance the load among multiple web servers). Similarly, Server Instances 315a-n are distributed among multiple physical servers as engineering needs dictate. Client requests (from Virtual App SDK 125 in FIG. 1) for virtual app sessions are distributed by Load Balancer 310 among Server Instances 315a-n. Following is a description of one embodiment of the major functional components of each Server Instance 315.

VM Connection Controller 370 maintains persistent connections with each VM (Mobile VM 225) to permit two-way communication between the various modules of VM Slice Coordinator 300 and each Mobile VM 225. VM App Selector 350 maintains knowledge of which native mobile app binaries are installed (on each Mobile App Server 210) and available to each Mobile VM 225, and monitors usage data over time to ensure that each native mobile app binary is installed on a sufficient number of VMs to enable virtual app sessions to be started without perceptible delays.

Upon receiving a request for a virtual app session, Session Authenticator 320 validates the request by authenticating the user and ensuring that the user has authority to access the requested virtual app. Other factors can be validated as well, including the suitability of the connection between the user's client Mobile Device 120 and VM Slice Coordinator 300. In one embodiment, subsequent validation occurs once a connection is established between Mobile Device 120 and Mobile VM 225 (but before a session is initiated). In this embodiment, no further involvement of Session Authenticator 320 is required, beyond merely passing an authentication token to VM App Session Initiator 360.

Once a user is authenticated, VM Selector 340 selects an appropriate VM to fulfill the virtual app session request. VM Selector 340 maintains a list of available VMs, which it filters to match the requirements of the request. VM Selector 340 makes its decision after considering such factors as suitability of each VM (e.g., availability of the requested app and corresponding OS simulator), suitability of the Mobile Device 120 platform (e.g., phone, tablet, etc.), proximity of a suitable VM to Mobile Device 120, etc. In other embodiments, Physical Mobile Devices 255a-n (FIG. 2b) can also be selected, as well as VMs.

Once a VM (Mobile VM 225) is selected, VM App Session Initiator 360 instructs Mobile VM 225 to prepare to initiate a virtual app session. In one embodiment, suitable connectivity between Mobile VM 225 and Mobile Device 120 is confirmed, and similar authentication occurs as noted above.

In one embodiment, VM App Session Initiator 360 invokes User Session Data Storage Server 330 to obtain a URL for retrieval of any available user session data (e.g., from a prior session), and forwards that URL to Mobile VM 225 to retrieve that data. Such session data is stored in Server-Side DB 114, and includes raw session data, a Session ID (as discussed above), a mobile app identifier, and, in other embodiments, various other session-related data and metadata.

Upon receiving the session data, Mobile VM 225 then instantiates and loads Native App Instance 226 and initiates the session. When the session is completed, Mobile VM 225 uses the URL to store the new session data in Server-Side DB 114 (thereby enabling a mobile app to resume a session from its previous "state," even if the mobile app does not explicitly save that state).

As noted above, once a virtual app session begins, coordination is required between the native mobile app executing in SERVER Environment 101 and the virtual app running in CLIENT Environment 102. This coordination is facilitated by communications between App Communicator 228 in VM Mobile App SLICE 215 (running Native App Instance 226) and Virtual App SDK 125 in Mobile Device 120. This communication process is described below in greater detail with reference to FIGS. 4-9.

Figure 4A:
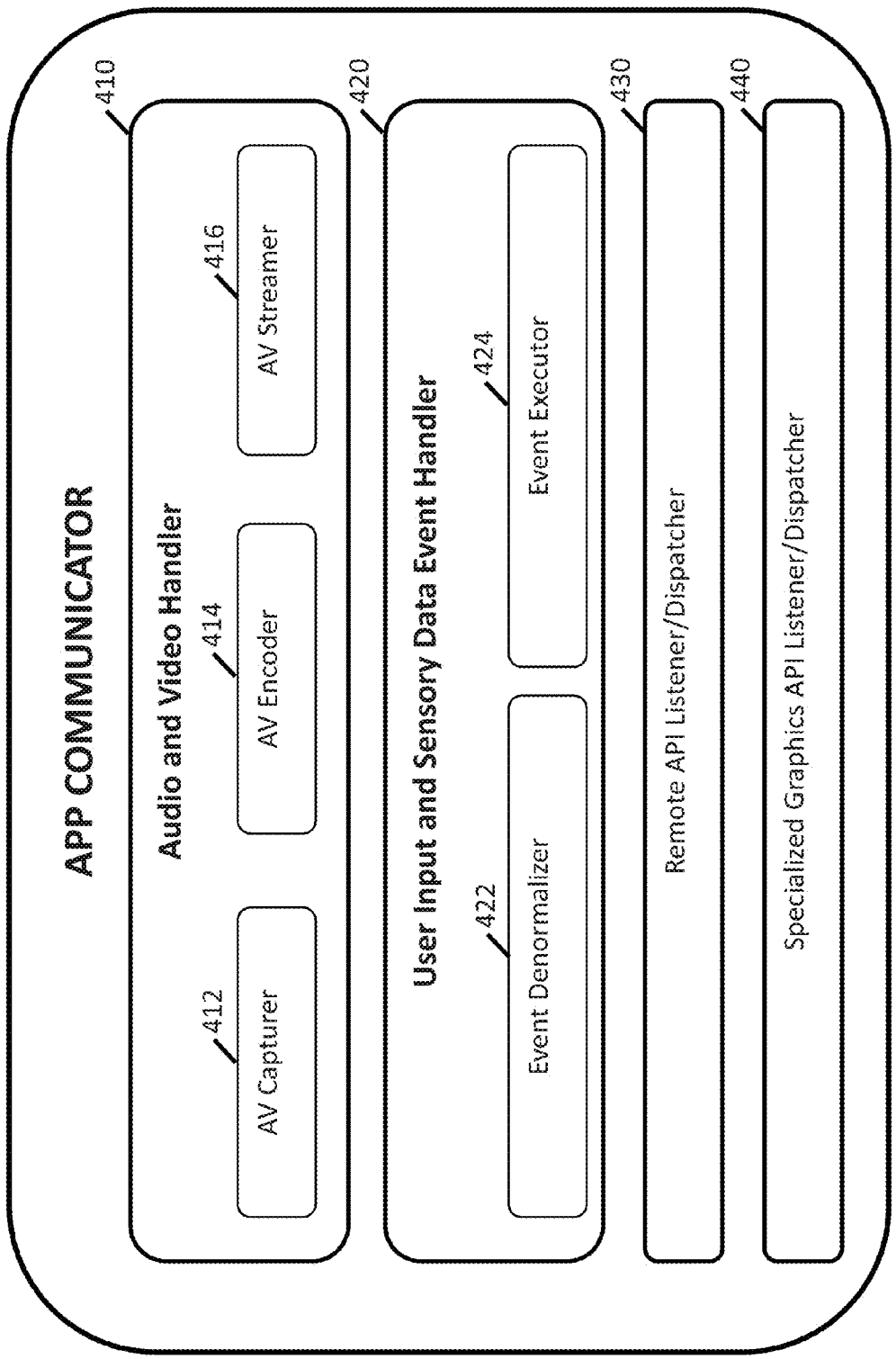
FIG. 4A is a more detailed block diagram of the App Communicator illustrated in FIGS. 2A and 2B.
Figure 4B:
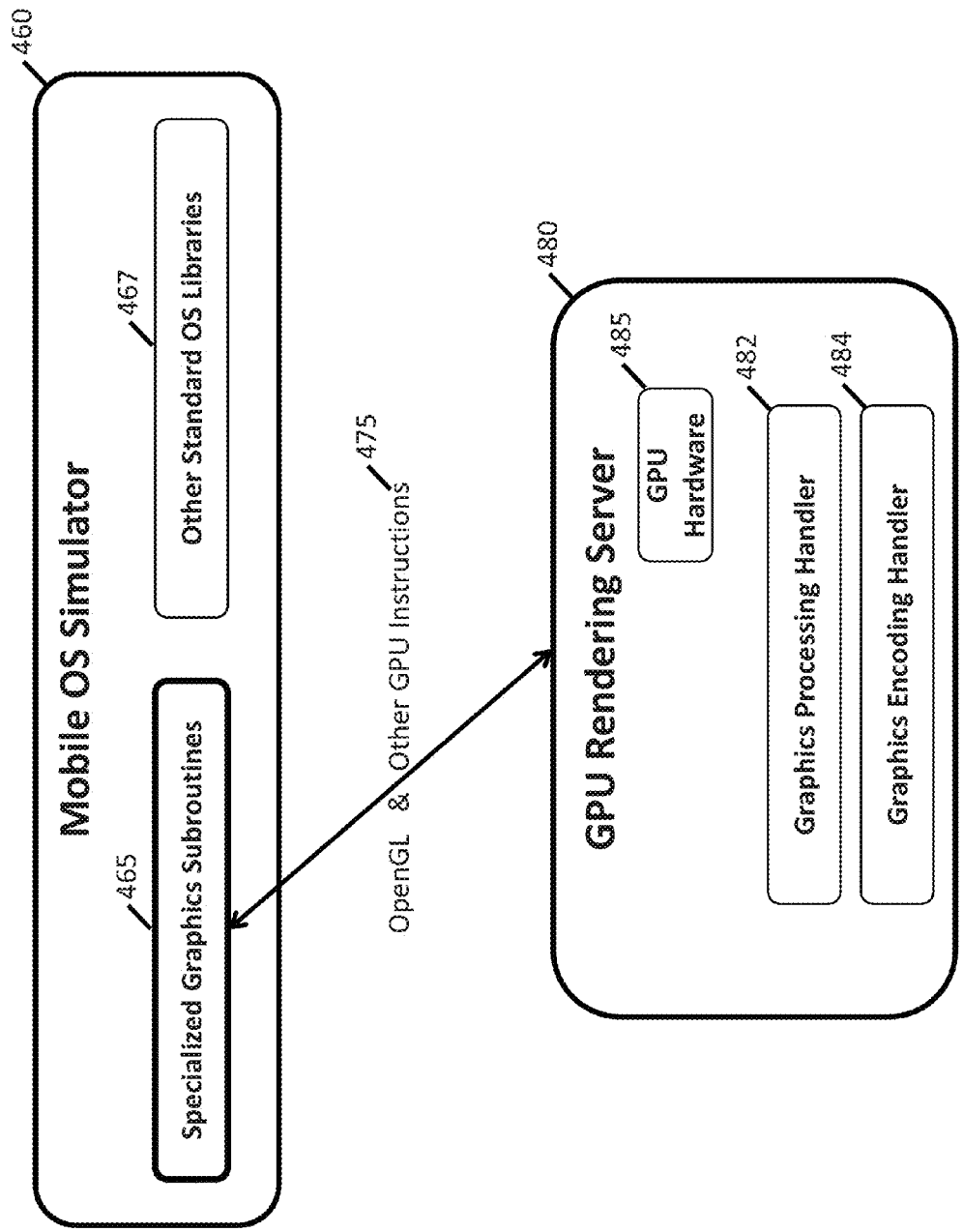
FIG. 4B is a block diagram illustrating one embodiment of the interception and handling of Specialized Graphics Subroutines (in a mobile OS simulator running in a Mobile VM) by a GPU Rendering Server.

FIG. 4a is a more detailed block diagram of the App Communicator illustrated in FIGS. 2a (228) and 2b (268). The functionality of App Communicator 400 can be categorized into 3 major groups: (1) Audio and Video Handler 410, which streams screen displays from the mobile app to the virtual app for rendering on the remote client device; (2) User Input and Sensory Data Event Handler 420, which provides input and other events from the virtual app on the remote client device to the mobile app, and (3) Remote API Listener/Dispatcher 430, which intercepts mobile app requests for app-initiated events, and provides them to the virtual app on the remote client device (e.g., to access local resources).

Audio and Video Handler 410 extracts the screen displays and audio generated by the mobile app running on Mobile VM 225, and processes and streams them to Virtual App SDK 125 for playback on Mobile Device 120. AV Capturer 412 captures audio and video generated by Native App Instance 226 and/or by the mobile OS simulator (in Mobile VM 225) running Native App Instance 226. In one embodiment, AV Capturer 412 extracts frame buffers from Native App Instance 226, while in another embodiment, AV Capturer 412 includes audio and graphics modules that directly capture the audio and video rendered by Native App Instance 226.

AV Encoder 414 resizes and compresses the captured audio and video streams to a size/bitrate desired by Mobile Device 120. Forward error correction (FEC) data is then added to the stream to enable Virtual App SDK 125 to recover packets lost in transmission. AV Streamer 416 packetizes that stream and wraps it in a network protocol for streaming to Virtual App SDK 125. Various techniques are employed by AV Streamer 416 (in some cases with assistance from Virtual App SDK 125), to minimize latency, including the use of UDP protocol to avoid retransmission.

In one embodiment, AV Streamer 416 streams screen displays to a web browser window on Mobile Device 120. In this embodiment, no Virtual App SDK 125 is required to be installed in Mobile Device 120, as Virtual App SDK 125 can be implemented in HTML 5 and delivered as a web page to the client web browser, which automatically handles delivery of user-initiated events to a web server in SERVER Environment 101 (though functionality relating to app-initiated events may be limited, depending upon the client web browser's ability to access local resources on Mobile Device 120). HTML 5 and Javascript codecs are employed in this embodiment to monitor the CPU performance in Mobile Device 120, as well as network performance, and to adjust streaming parameters accordingly to minimize latency and jitter.

Depending upon network performance at any given time, AV Streamer 416 can dynamically switch among various codecs (e.g., mjpeg, mpeg1, h.264, etc.) to minimize packet loss, latency, jitter, etc. This dynamic codec switching technique is of particular importance when screen displays are rendered to a client web browser (along with support for audio). In this embodiment, the best method of encoding/streaming parameters is selected based upon current network conditions. For example, when packet loss increases, intra-packet refresh can be turned on and more FEC data can be employed to recover the lost packets. Other factors considered include incoming packet loss, bandwidth, and jitter between packets, as well as outgoing packet size, encoding quality (frame rate, bit rate, etc.), FEC parameters for redundancy, choice of codec, etc.

While Audio and Video Handler 410 addresses the streaming of screen displays to the remote client device, User Input and Sensory Data Event Handler 420 processes event data (e.g., user inputs) coming from the remote client device (i.e., from Virtual App SDK 125). Such event data can include events and related data regarding both user-initiated events (e.g., a particular key pressed by the user, button touched by the user, device orientation changed by the user, etc.) and app-initiated events (e.g., location data from an app-initiated GPS reading).

Note that such data may originate in various different formats, depending upon the Mobile Device 120 platform (e.g., iOS or Android tablet or phone). Moreover, the format recognized by the mobile OS in Mobile VM 225 may also differ from the one employed by Native Mobile OS 121 in Mobile Device 120. To address these potential differences, a neutral "normalized" format is employed in Virtual App SDK 125, as explained below with reference to FIG. 6 (e.g., to convert an iOS touch event to this normalized format). Event Denormalizer 422 converts the normalized event data received from Virtual App SDK 125 into a format recognized by the mobile OS in Mobile VM 225 (e.g., an Android OS or iOS format), and Event Executor 424 dispatches the event and any related data to Mobile VM 225.

As noted above, it is not sufficient merely to receive user-initiated events, pass them to Mobile VM 225, and then return the resulting generated screen displays to Virtual App SDK 125 on Mobile Device 120. Certain events, i.e., app-initiated events that require access to local device resources (including local data, for example, in the device address book, in emails or in a local media collection), must be executed on Mobile Device 120 rather than on Mobile VM 225. For example, the mobile OS in Mobile VM 225 cannot execute a request to "take a picture" because the local device camera is located on Mobile Device 120.

To address these situations, Remote API Listener/Dispatcher 430 effectively "bridges" these requests (also referred to herein as "Remote APIs") from the mobile app to the remote device. In particular, Remote API Listener/Dispatcher 430 intercepts these Remote API requests and dispatches them to Virtual App SDK 125 on Mobile Device 120 for processing. Any resulting data that would normally be returned by Native Mobile OS 121 is intercepted by Virtual App SDK 125 and sent back to Remote API Listener/Dispatcher 430, which forwards such event data (in this case relating to an app-initiated event) to User Input and Sensory Data Event Handler 420 for processing as described above.

For example, if Native App Instance 226 requests particular GPS data (e.g., when a user wants to know his distance from a desired landmark) from the local device GPS chip, Remote API Listener/Dispatcher 430 intercepts this request, dispatches it to the remote client device, which processes the request and returns the resulting GPS data to Remote API Listener/Dispatcher 430, which then forwards that GPS data to User Input and Sensory Data Event Handler 420 for processing—where the GPS data eventually makes its way back to Native App Instance 226 via Mobile VM 225. This process is discussed in greater detail below with reference to FIGS. 5-9.

In some cases, however, the size of the resulting data is too large, as a practical matter, to be delivered over network 105 back to App Communicator 400. For example, a 1080p uncompressed video stream from a local device camera would require 1.49 Gbps of bandwidth, and could not feasibly be delivered in real time. In such cases, Virtual App SDK 125 employs an adaptive compression technique to ensure sufficient compression to accommodate real time transmission. In other cases, lossy compression and lower resolution may be sufficient. In any event, Audio and Video Handler 410 reverses the transformation in order to restore the data into a format that the mobile application is expecting.

In one embodiment, Remote API Listener/Dispatcher 430 intercepts these Remote API requests (for app-initiated events) by modifying those system libraries of the mobile OS in Mobile VM 225 that would otherwise handle such Remote API requests. In effect, calls to those system libraries are re-routed to a replacement code module that effectively forwards the Remote API call to the remote client device. But, this approach requires access to the source code for the mobile OS in Mobile VM 225, which is not always available.

In such cases, other well-known approaches are employed. In one embodiment, a technique known as "app wrapping" links the binary of Native App Instance 226 to a custom code module with identical interfaces to those of the Remote API calls. In effect, the native implementation (in the mobile OS in Mobile VM 225) of those Remote API calls is "replaced" by this custom code module, despite the lack of access to the source code for that native mobile OS. In another embodiment, an alternative to app wrapping known as "code injection" is employed. In this embodiment, custom code (analogous to that used for app wrapping) is "injected" at runtime into the process that is running Native App Instance 226, and effectively overrides/replaces the Remote API handlers.

Whether replaced directly by modifying the system libraries of the mobile OS in Mobile VM 225, or indirectly via app wrapping or code injection, Remote API Listener/Dispatcher 430 effectively intercepts and forwards these Remote API requests to the remote client device (Virtual App SDK 125 on Mobile Device 120), where they are implemented. This "bridging" of Remote APIs from the mobile app to the remote client device is also illustrated in FIG. 5 below.

In addition to intercepting Remote API calls, certain "GPU-centric" requests are, in one embodiment, intercepted and processed outside of Mobile VM 225. For example, as noted above, Mobile VM 225 from FIG. 2a includes a mobile OS simulator to run Native App Instance 226. As illustrated in block diagram 450 of FIG. 4b, Mobile OS Simulator 460 includes, in addition to Other Standard OS Libraries 467, certain Specialized Graphics Subroutines 465 that, when invoked by Native App Instance 226, are designed to rely upon local GPU hardware in Mobile Device 120. In one embodiment, the OpenGL and Other GPU Instructions 475 from Specialized Graphics Subroutines 465 are instead intercepted by Specialized Graphics API Listener/Dispatcher 440 and forwarded to GPU Rendering Server 480 for processing. It should be noted that multiple VM Mobile App SLICEs 115a-n (i.e., multiple mobile app "sessions") can leverage (e.g., "timeshare") a single GPU Rendering Server 480.

In one embodiment, GPU Rendering Server 480 includes Graphics Processing Handler 482 to process the OpenGL and Other GPU Instructions 475. In the case of OpenGL instructions, it renders the frames and, if the resulting data is needed by the VM Mobile App SLICEs 115a-n for further processing, forwards such data back to Specialized Graphics Subroutines 465 (which returns the data back to Native App Instance 226). If, on the other hand, the resulting data is ready to be encoded, it is forwarded to Graphics Encoding Handler 484, which leverages GPU Hardware 485 to encode the rendered frames. In this manner, these "GPU-centric" requests are handled as efficiently by GPU Rendering Server 480 as they would be by the GPU hardware in local Mobile Device 120, thus facilitating a user experience that is practically equivalent to running native mobile apps.

Turning to FIG. 5, the process of "bridging" Remote APIs from the mobile app to the remote client device is illustrated via pseudo code in both server-side Mobile App 510 (comparable to Native App Instance 226 in FIG. 2) and in client-side Native Mobile OS 520 (comparable to Native Mobile OS 121 in FIG. 1). While Mobile App 510 is running on a server (e.g., in Mobile VM 225), the virtual app is running on remote client Mobile Device 120, and relying on Native Mobile OS 520. When the user interacts with Mobile Device 120 (e.g., by pressing a key or touching a button), Native Mobile OS 520 detects this user-initiated event.

Upon detecting Keystroke Event 522, Native Mobile OS 520 automatically "pushes" that event to the app running on Mobile Client 120, in this case the virtual app—Virtual App SDK 125. As illustrated by arrow 530, Virtual App SDK 125 redirects Keystroke Event 522 to User Input and Sensory Data Event Handler 420 in App Communicator 400, where it is issued to Mobile App 510 and handled by Keystroke Event Handler 512 (e.g., displaying the keystroke on the screen). Note that, to display the keystroke on the screen, the screen display will be streamed by Audio and Video Handler 410 to Virtual App SDK 125, as explained above.

Similarly, upon detecting Upon detecting user-initiated Touch Event 524, Native Mobile OS 520 automatically "pushes" that event to Virtual App SDK 125, which (as illustrated by arrow 540) redirects it to User Input and Sensory Data Event Handler 420 in App Communicator 400, where it is issued to Mobile App 510 and handled by Touch Event Handler 514 (e.g., clearing the screen—streamed by Audio and Video Handler 410 to Virtual App SDK 125, as explained above).

As noted above, unlike these user-initiated events, app-initiated events require a different mechanism because they are not automatically detected and pushed by Native Mobile OS 520. For example, when Mobile App 510 requests an app-initiated event, such as Take Picture Request 515, that request is intercepted (as illustrated by arrow 550) by Remote API Listener/Dispatcher 430 in App Communicator 400 and redirected to Native Mobile OS 520 (via Virtual App SDK 125), as discussed above. Built-in Take Picture Handler 525 (defined in the API of Native Mobile OS 520) then implements the request—e.g., by invoking the designated local device camera to take and store the picture, and issuing Picture Taken Event 526 to notify the currently running virtual app (Virtual App SDK 125) that the app-initiated event has concluded. As illustrated by arrow 560, Virtual App SDK 125 then redirects this notification to Mobile App 510, where it is handled by Picture Taken Event Handler 516 (e.g., to retrieve the picture from the Local Data Store 122 and display it on the screen). Note that retrieval of the picture may itself require another request for an app-initiated event, handled in a similar manner.

Figure 6:
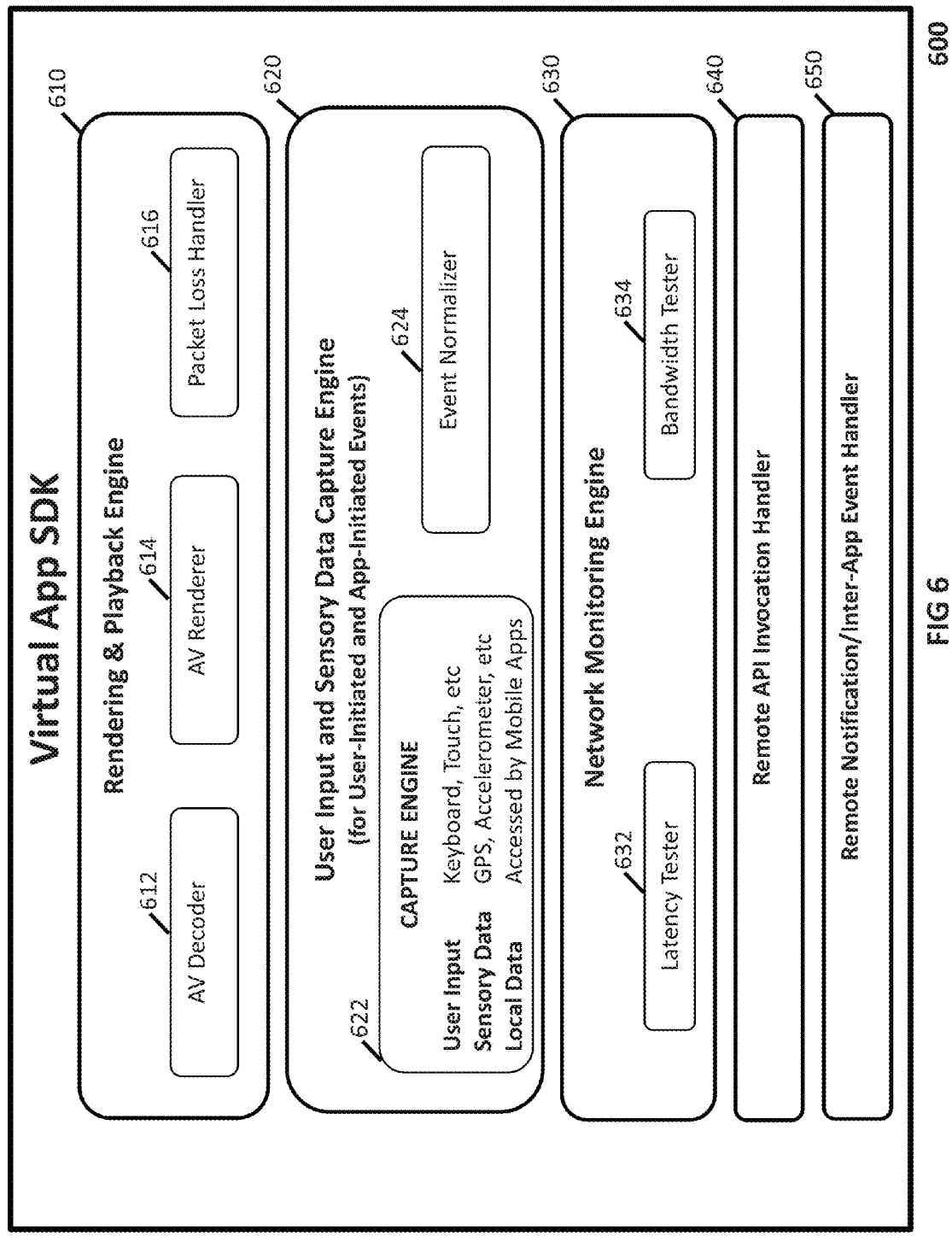
FIG. 6 is a more detailed block diagram of the Virtual App SDK illustrated in FIG. 1.

Turning to the virtual app functionality on the remote client device (Mobile Device 120), the block diagram in FIG. 6 illustrates the key components of Virtual App SDK 600 (125 in FIG. 1). The screen displays delivered by Audio and Video Handler 410 of App Communicator 400 must be rendered on the screen of Mobile Device 120. This functionality is handled by Rendering and Playback Engine 610. AV Decoder 612 decompresses the audio and video stream and AV Renderer 614 utilizes the appropriate methods in Native Mobile OS 121 to play the raw audio samples via the speaker on Mobile Device 120 and render the video samples onto the screen of Mobile Device 120 (while simultaneously resizing the individual frames to the correct size on the screen).

Given the unreliable nature of streaming audio and video streams over networks such as Internet 105, regardless of the choice of protocol, Packet Loss Handler 616 ensures that lost packets do not result in audio glitches and video artifacts. It keeps track of packets lost in transmission, and utilizes embedded FEC data in the stream to attempt to recover these lost packets. In other embodiments, Packet Loss Handler 616 could be implemented in App Communicator 400 in SERVER Environment 101.

User Input and Sensory Data Capture Engine 620 is responsible for capturing data (via Capture Engine 622) related to both user-initiated and app-initiated events and, as noted above, normalizing the captured data (via Event Normalizer 624) before transmitting the normalized data to server-side App Communicator 400. Capture Engine 622 captures user-initiated events, such as Keystroke Event 522 and Touch Event 524 (FIG. 5), as well as local data and sensory data resulting from app-initiated events, such as the picture taken as a result of Take Picture Request 515. As noted above, certain data, such as large images, may need to be compressed by Virtual App SDK 600 before being transmitted to App Communicator 400.

Network Monitoring Engine 630 monitors both network latency (via Latency Tester 632) and network bandwidth (via Bandwidth Tester 634) with assistance from server-side Audio and Video Handler 410 of App Communicator 400. Latency Tester 632 monitors latency between Mobile Client 120 and Mobile VM 225 (and initially VM Slice Coordinator 300 before a VM is selected) to ensure the latency is appropriate to run a virtualized app session. Bandwidth Tester 634 monitors available bandwidth using various techniques, including timed burst transmissions and bandwidth approximation based on latency between the endpoints. When available bandwidth drops below a certain threshold, Virtual App SDK 600 can no longer render a virtualized app session.

Remote API Invocation Handler 640 works in conjunction with Remote API Listener/Dispatcher 430 as discussed above. Upon receiving an intercepted Remote API app-initiated event request from Remote API Listener/Dispatcher 430, Remote API Invocation Handler 640 forwards the request to Native Mobile OS 121 to be executed locally. Any resulting data that would normally be returned by Native Mobile OS 121 is intercepted and sent back to Remote API Listener/Dispatcher 430, where it is forwarded to User Input and Sensory Data Event Handler 420 for processing as described above with reference to FIGS. 4 and 5. This process is further described in greater detail below with reference to FIG. 8.

Notification/Inter-App Event Handler 650 addresses situations in which it is necessary to invoke another native mobile app on Mobile Device 120. This could occur when Remote API Listener/Dispatcher 430 intercepts a request from Native App Instance 226 that requires invocation of another native mobile app on Mobile Device 120, and forwards that request to Notification/Inter-App Event Handler 650 for implementation. For example, Native App Instance 226 might request data from the address book on Mobile Device 120. Note, however, that similar situations could also originate on Mobile Device 120 and require interception by Notification/Inter-App Event Handler 650 (e.g., if a native app containing Virtual App SDK 600 is unable to open a document having an unknown file format, which Virtual App SDK 600 is registered to handle).

In any event, the request is ultimately handled by Notification/Inter-App Event Handler 650, because access to a local resource on Mobile Device 120 (in this case, another native mobile app) is required. The other native mobile app is invoked, with the assistance of Native Mobile OS 121, and the resulting data retrieved, at which point Notification/Inter-App Event Handler 650 passes this data back to App Communicator 400 as discussed above. This process is further described in greater detail below with reference to FIG. 9.

Figure 7:
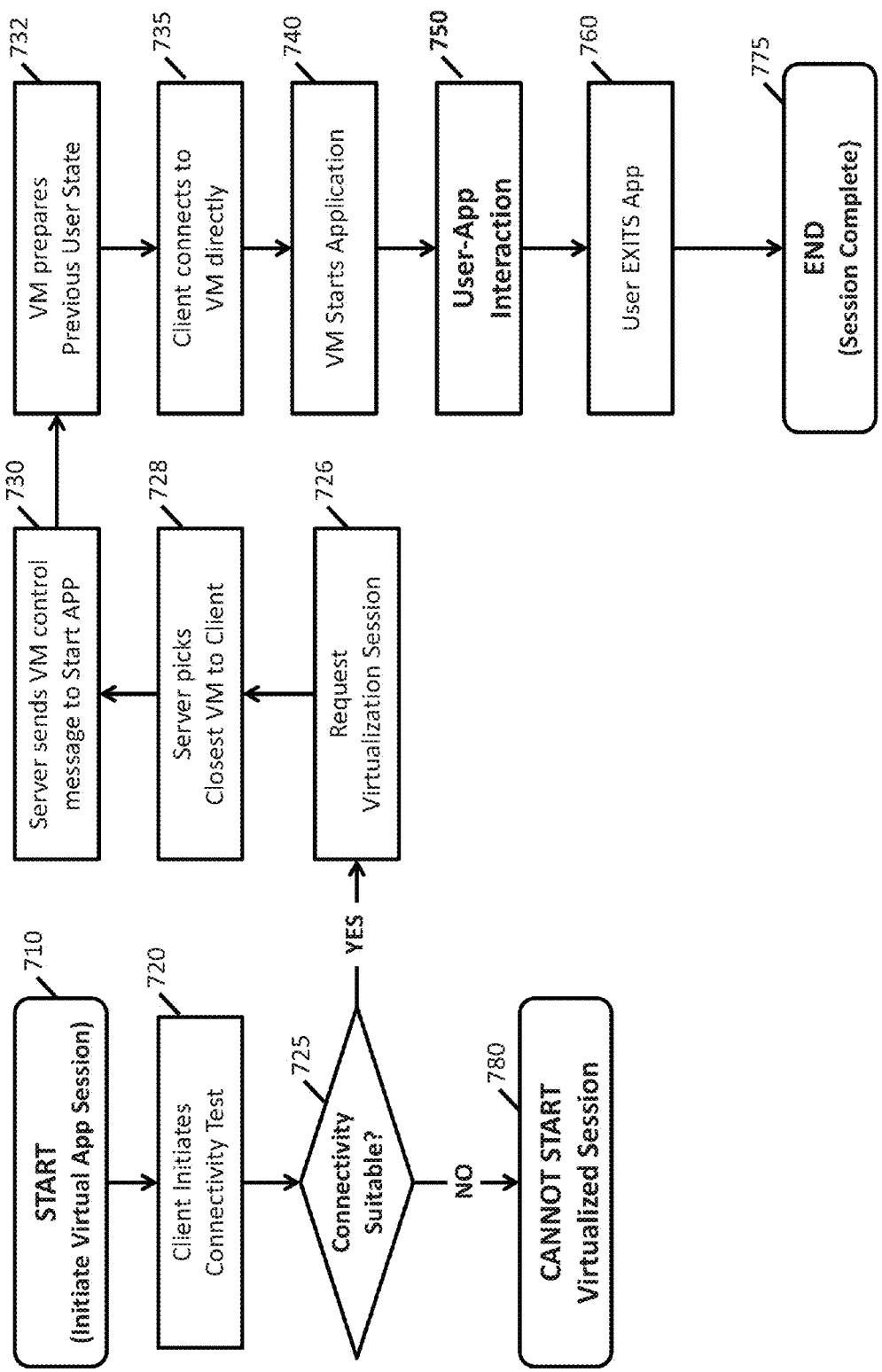
FIG. 7 is a flowchart illustrating a process of an embodiment of the present invention in which a Virtual App Session is initiated between a Mobile App Server and a client Mobile Device.

Turning to FIG. 7, flowchart 700 illustrates an embodiment of a process in which a virtual app session is initiated between server-side VM 225 running the mobile app and Mobile Device 120 running the virtual app (i.e., Virtual App SDK 125). Beginning at step 710, the virtual app session is initiated, for example, by a user clicking on a screen icon representing the virtual app. In one embodiment, Network Monitoring Engine 630 in Virtual App SDK 600 first initiates a connectivity test at step 720 to determine if the network connection is suitable to run a virtualized app session. As noted above, this involves monitoring network latency and bandwidth (and, in other embodiments, additional network connectivity factors). Ultimately, in step 725, a determination is made as to whether the network connection is suitable. If not, the virtual app session terminates at step 780.

Otherwise, Virtual App SDK 600 forwards this session-initiation request, at step 726, to VM Slice Coordinator 300 (described in greater detail above with reference to FIG. 3). Ultimately, at step 728, VM Slice Coordinator 300 selects an appropriate VM and sends a message, at step 730, to Mobile VM 225 to start Native App Instance 226. As noted above, VM Slice Coordinator 300 also forwards a URL which Mobile VM 225 utilizes to retrieve any user session data. Then, at step 732, Mobile VM 225 prepares the user state, connects to Virtual App SDK 600 (at step 735) and launches Native App Instance 226 (at step 740).

In one embodiment, Mobile VM 225 preloads Native App Instance 226 to minimize the perceived load time to the user. For example, an initial screen can be streamed to the user, and Native App Instance 226 can then be loaded and paused, awaiting interaction by the user. Moreover, because Native App Instance 226 is running in server-side Mobile VM 225, execution can not only be paused, in one embodiment, but also "fast-forwarded" to any point in the runtime execution of the mobile app. As will be discussed in greater detail below, this "fast forward" capability provides many different useful opportunities. For example, without customizing a game, a user could be offered the opportunity to jump to a particular point in the game. Mobile app "state" could be stored across different client devices. The same "session ID" could be supported across multiple client devices (e.g., iPhone, iPad, desktop computer, etc.). A precise state could be stored even if the mobile app did not otherwise support the saving of state. Many other variations of this "fast forward" capability will be apparent to one skilled in the art.

At step 750, the virtual app session is in progress, and interaction between the user and the virtual app, and between Virtual App SDK 600 and App Communicator 400, begins in earnest. This interaction process (particularly as it relates to the handling of user-initiated events and app-initiated events) is described in greater detail below with reference to FIG. 8. Eventually, the user exits the virtual app (at step 760) and the session ends (step 775).

Figure 8:
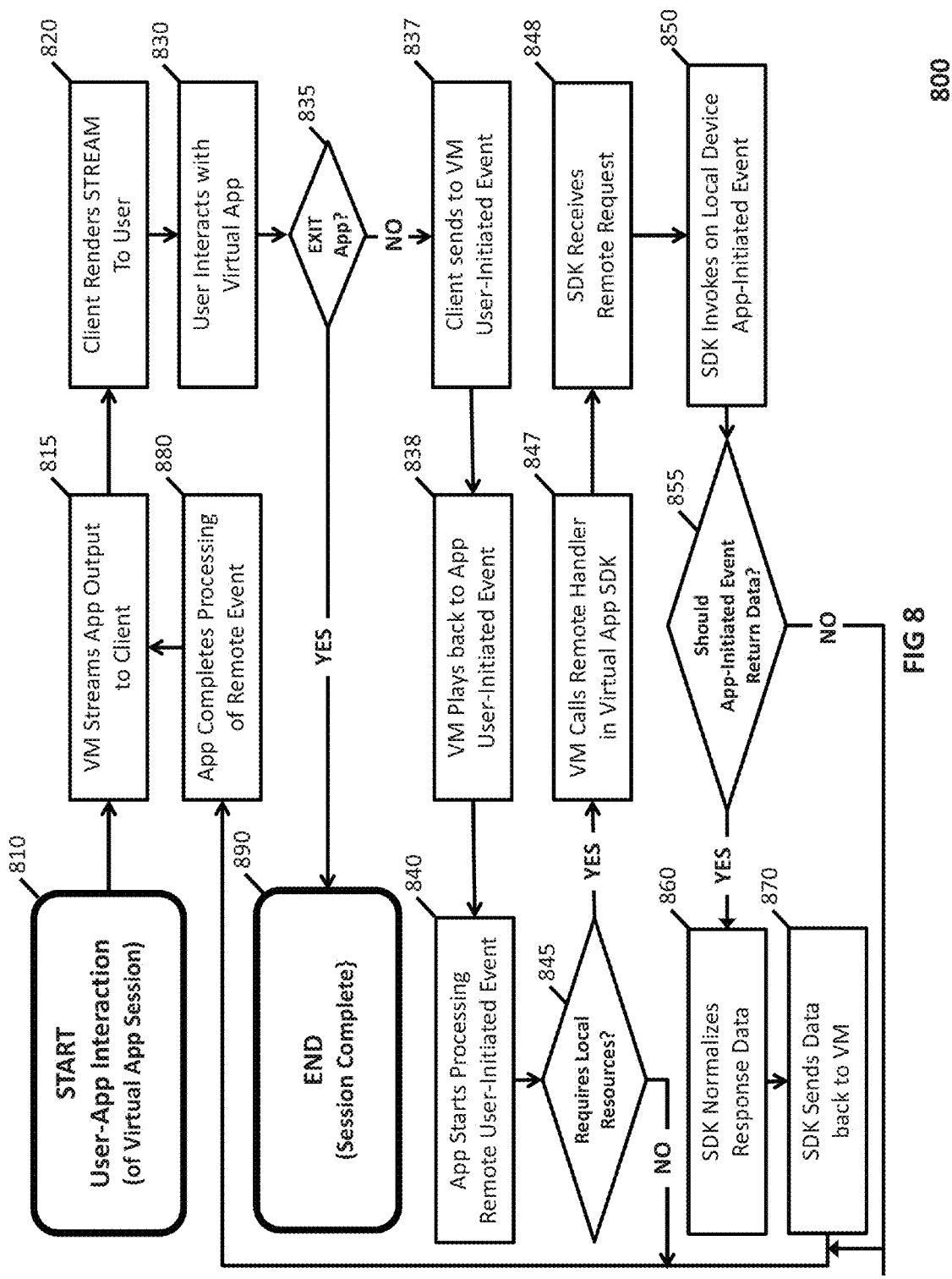
FIG. 8 is a more detailed flowchart of the User-App Interaction illustrated in FIG. 7, in particular illustrating the handling of both user-initiated and app-initiated events in order to provide a user experience that is practically equivalent to running native mobile apps.

Turning to FIG. 8, flowchart 800 illustrates the details of the process identified in step 750 (and starting at step 810), in particular the handling of both user-initiated and app-initiated events in a manner that provides a user experience that is practically equivalent to running native mobile apps. Once Native App Instance 226 is launched (at step 740), Mobile VM 225 streams its audio and video output (step 815) to remote client Virtual App SDK 600, which renders that stream, at step 820, onto the screen of Mobile Device 120. The user then interacts with the virtual app, at step 830 (e.g., generating keystroke and touch events). Eventually, at some point, the user will exit the virtual app (step 835), and the session will terminate (at step 890). For example, Mobile VM 225 would exit Native App Instance 226, freeing it to launch another mobile app upon request.

In most cases, however, the user will interact with the virtual app, resulting in a user-initiated event (such as a keystroke or touch event). Virtual App SDK 600 will then, at step 837, send the user-initiated event to App Communicator 400, which will forward that event (step 838) ultimately to Native App Instance 226 which, at step 840, will start processing that user-initiated event.

If Native App Instance 226 does not request an app-initiated event that requires any local resources in Mobile Device 120 (decision step 845), then it will complete processing of the event (step 880) and return to step 815, where Mobile VM 225 streams the resulting screen displays (audio and video output) to remote client Virtual App SDK 600.

However, if at step 845, a request for an app-initiated event (requiring local resources in Mobile Device 120) is detected, then Mobile VM 225 will (at step 847) call a remote handler (due to the interception by Remote API Listener/Dispatcher 430) which will forward that request for an app-initiated event to Virtual App SDK 600 (received at step 848). Virtual App SDK 600 then forwards that request to Native Mobile OS 121 to invoke that app-initiated event on Mobile Device 120 (at step 850).

In some cases, no data will result from an app-initiated event. If, however, at step 855, it is determined that the event results in data to be returned to the mobile app (running in Mobile VM 225), then Virtual App SDK 600 normalizes the resulting data (step 860) and returns the normalized data (step 870) back to Native App Instance 226, which completes processing of the event (step 880).

Figure 9:
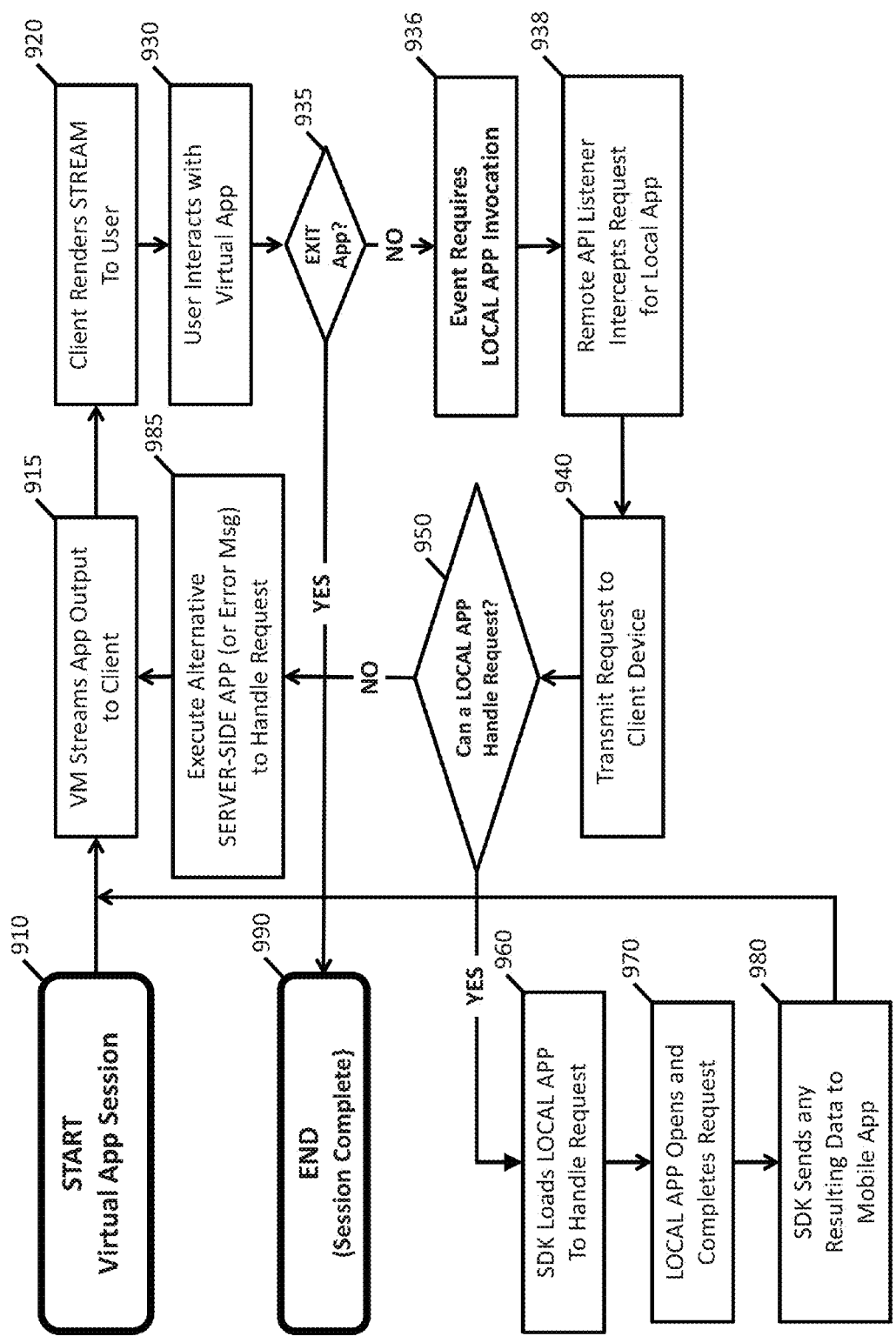
FIG. 9 is a flowchart illustrating a process involving cross-application communication in an embodiment of the present invention.

Turning to FIG. 9, flowchart 900 illustrates a similar case to the processing of app-initiated events in FIG. 8, but with the added complication of requiring the invocation of another local app on Mobile Device 120. As before, once the virtual app session is started (step 910), Mobile VM 225 streams its audio and video output (step 915) to remote client Virtual App SDK 600, which renders that stream, at step

920, onto the screen of Mobile Device 120. The user then interacts with the virtual app at step 930 (e.g., generating keystroke and touch events). Eventually, at some point, the user will exit the virtual app (step 935), and the session will terminate (at step 990), freeing Mobile VM 225 to launch another mobile app upon request.

Otherwise, step 936 addresses the situation in which Remote API Listener/Dispatcher 430 detects the need to invoke another native mobile app on Mobile Device 120. This situation is contrasted with FIG. 8, which addresses the situation in which user-initiated events are intercepted by Virtual App SDK 600, or requests for app-initiated events are intercepted by Remote API Listener/Dispatcher 430.

For example, as noted above, Native App Instance 226 might request data from the address book on Mobile Device 120, in which case Remote API Listener/Dispatcher 430 would intercept this request (at step 938) and transmit the request to Virtual App SDK 600 (at step 940). In another embodiment (not shown), a similar situation could originate on Mobile Device 120. For example, a native app containing Virtual App SDK 600 might be unable to open a document having an unknown file format, which Virtual App SDK 600 is registered to handle.

In either case, at step 950, Native Mobile OS 121 determines whether a native local app (including Virtual App SDK 600) is able to handle the request. If not, then (in one embodiment) control returns to App Communicator 400 which, at step 985, will execute an alternative server-side app to handle the request (or generate an error message if no appropriate server-side app is available), and then return control to step 915 (to stream the audio and video output to remote client Virtual App SDK 600).

If, however, a local app is available, then Virtual App SDK 600 will (at step 960) command Native Mobile OS 121 to launch that local app to handle the request. Once the other local app is launched and completes the request (step 970), then Virtual App SDK 600 will (at step 980) send any resulting data back to Native App Instance 226, which will then return control to step 915 (to stream the audio and video output to remote client Virtual App SDK 600).

Having described the functional components and dynamic operation of mobile app remote virtualization system 100, the benefits of the present invention will now be discussed in the context of various novel use-case scenarios involving virtual apps. Note in particular that, as described above, these virtual apps can, in one embodiment, support requests by their corresponding server-side app (e.g., running on Mobile VM 225) for app-initiated events requiring access to local resources on a user's client device.

Figure 10B:
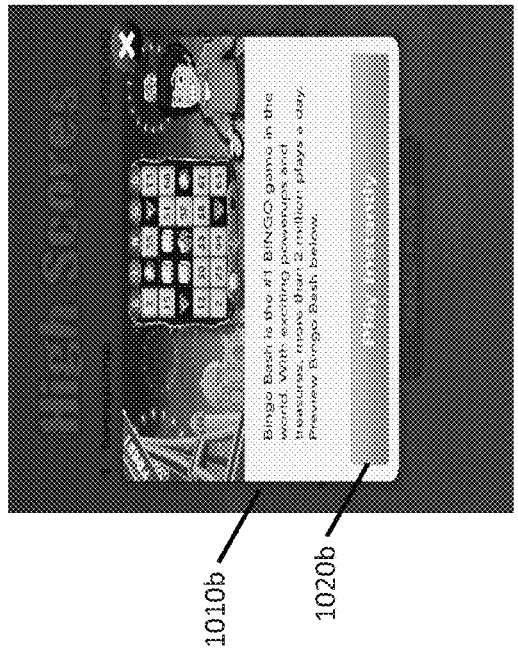
FIGS. 10A-10C are annotated screenshots of embodiments of various use-case scenarios of the present invention.
Figure 10A:
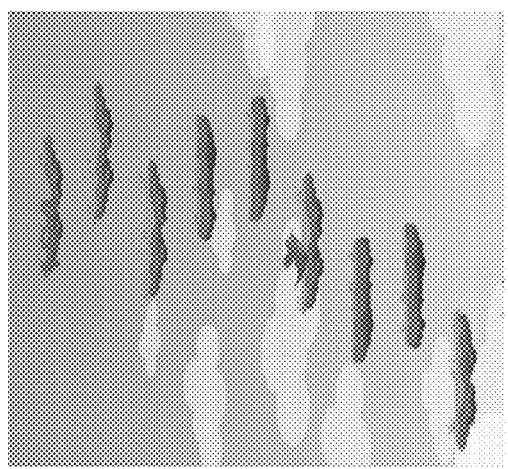
Figure 10C:

FIGS. 10*a-c* illustrate a "Try Before You Buy" scenario in which a user of a mobile device running a native mobile app (or, in another embodiment, a virtual app) encounters an advertisement for a new mobile app. Alternatives to mobile advertisements can also be employed in other embodiments, such as a link in an email, web page, or instant message, or practically any other form of media which a user of a mobile device (or other client device) might encounter.

Instead of limiting the user to viewing a typical mobile ad relating to the new mobile app, however, the present invention enables far more interactive ads that can in fact constitute fully functional mobile apps. Thus, instead of requiring the user to download and install the new mobile app, the user can immediately run the new mobile app as a virtual app with full functionality (limited only as desired by the owner—e.g., a time-limited demo).

FIG. 10*a* illustrates an initial native app 1000*a*, in this case the "TweeJump" app. While running native app 1000*a*, the user eventually encounters a screen (1000*b* in FIG. 10*b*) which includes a mobile ad 1010*b*, in this case for a new mobile app, entitled "Bingo Bash." Ad 1010*b* includes a "Play Instantly" button 1020*b* that enables a user to instantly play the Bingo Bash game as a "virtual app" on the user's mobile device. Upon clicking button 1020*b*, the Bingo Bash virtual app (1000*c* in FIG. 10*c*) is instantly launched and is fully functional, with the exception of a timer 1050*c* that limits the time the user can demo this otherwise fully functional mobile app.

As discussed above, the Bingo Bash virtual app 1000*c* consists essentially of Virtual App SDK 125 and Virtual App ID 126, embedded in the native TweeJump app 124*a* on the user's Mobile Device 120. When virtual app 1000*c* is launched, the native version of the Bingo Bash mobile app (Native App Instance 226) is also launched in Mobile VM 225 on distant Mobile App Server 110.

As is apparent from this "Try Before You Buy" scenario, the user of this embodiment of the present invention has the opportunity to immediately experience the new Bingo Bash mobile app without the significant obstacle of having to download and install the mobile app. This difference will likely result in a significant increase in the ultimate number of actual downloads of the mobile app, as potential customers will not be stifled by this significant barrier.

Moreover, it will be readily apparent to those skilled in the art that there exist numerous variations of this "Try Before You Buy" scenario. For example, a developer can now reach a much larger audience of potential "beta testers" of a mobile app under development via this mechanism. Even initial "market testing" of a very early "alpha" version (or even prototypes of individual features) is possible without departing from the spirit of the present invention. Even after a mobile app has been completed, users of incompatible mobile devices (e.g., Android phones running a virtual iOS mobile app) can experience the mobile app, for example, while it is being ported to the user's mobile device platform.

A more significant variation on this theme is illustrated in FIGS. 11*a-d*, which illustrate an embodiment of an "A-B Testing Scenario" in which an app developer can "market test" multiple different versions of an app. Employing multiple advertisements (in a similar manner as discussed above with reference to the "Try Before You Buy" scenario in FIGS. 10*a-c*), one version is made available to one group of potential customers while other versions are made available to other groups of potential customers.

Figure 11B:
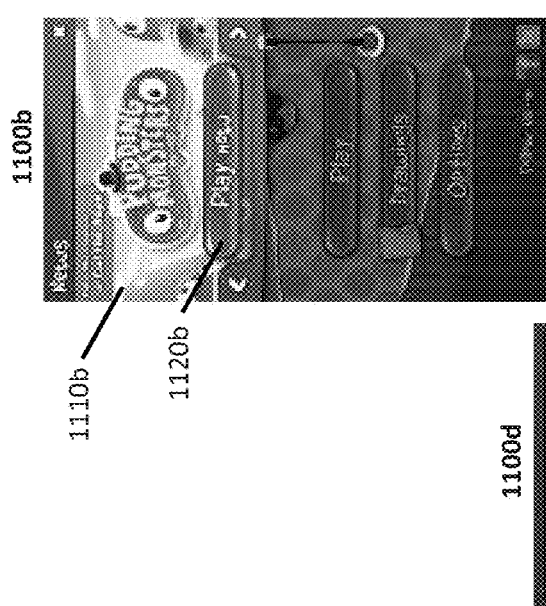
FIGS. 11A-11D are annotated screenshots of embodiments of various use-case scenarios of the present invention.
Figure 11D:
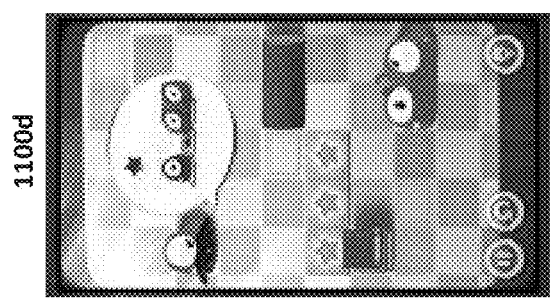
Figure 11C:
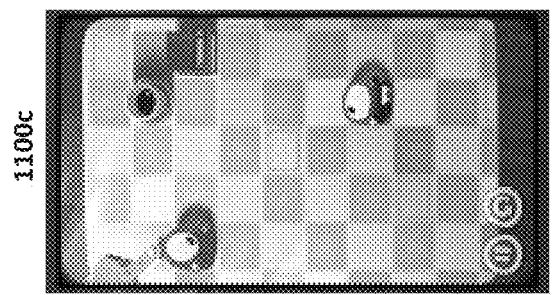
Figure 11A:
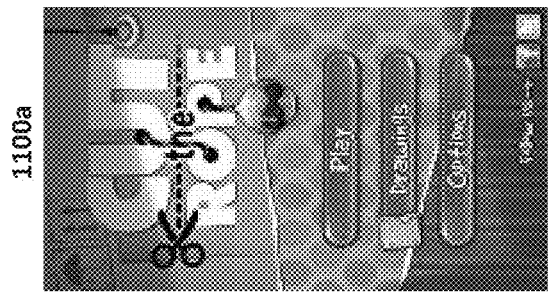

FIG. 11*a* illustrates an initial native app, in this case the "Cut the Rope" game 1100*a*. While running native app 1100*a*, the user eventually encounters a screen (1100*b* in FIG. 11*b*) which includes a mobile ad 1110*b*, in this case for a new mobile app, entitled "Pudding Monsters." Ad 1110*b* includes a "Play Instantly" button 1120*b* that enables a user to instantly play the Pudding Monsters game as a "virtual app" on the user's mobile device.

However, in this embodiment, the developer of the "Pudding Monsters" game desires to "market test" multiple (in this case, two) different versions of the game (each available in SERVER Environment 101). By utilizing two different versions of mobile ad 1110*b* (e.g., with identical appearances, but linking to different versions of the mobile app running on Mobile VM 225), some users will, upon clicking button 1120*b*, experience version 1100*c* in FIG. 11*c*, while others will experience version 1100*d* in FIG. 11*d*. In other embodiments, the identical mobile ad 1110*b* can be employed, with the selection of the appropriate version determined dynamically (e.g., based on a random or other algorithm, or user demographic data).

In any event, upon clicking button 1120*b*, one version of the Pudding Monsters virtual app (and corresponding Native App Instance 226 running in server-side Mobile VM 225) will be launched. In one embodiment, the virtual app on the user's Mobile Device 120 includes Virtual App SDK 125, utilizing different Virtual App IDs 126 to distinguish the two versions. The developer, by collecting valuable usage data for each version (1100*c* and 1100*d*), can make decisions as to which version (or features in one or more versions) to include in the completed version of the game—all without ever requiring any user to download and install the game.

Turning to FIGS. 12*a-d*, an "App Store Trial" scenario is illustrated, in which the provider of an app store (e.g., Apple's iOS "App Store" or Google's Android "Google Play Store" or various third-party alternatives) can offer trial versions of mobile apps, even in situations in which the developers of the mobile apps have not developed specific trial versions of their respective mobile apps. In one embodiment, a "timer" is overlaid on the screens generated by the mobile apps, and enforced to terminate the trial when time has expired. In other embodiments, a mobile OS developer could include a mechanism in their mobile OS to generate various different "uniform" implementations and enforcement of trial features with little or no effort required on the part of mobile app developers, other than to "subscribe" to desired features.

Figure 12A:
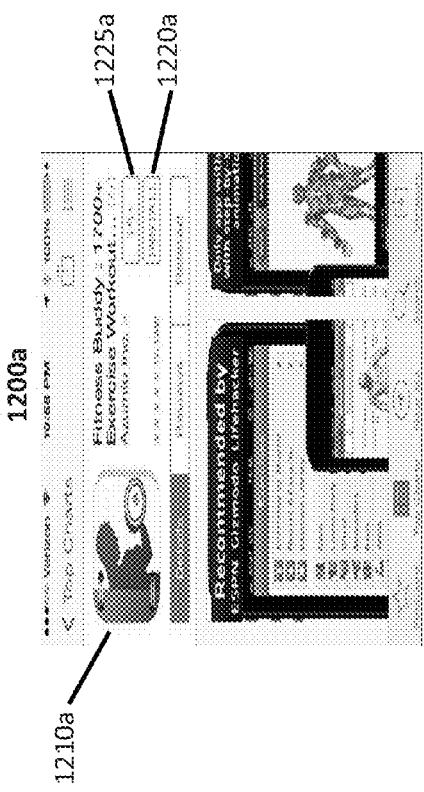
FIGS. 12A-12D are annotated screenshots of embodiments of various use-case scenarios of the present invention.
Figure 12D:
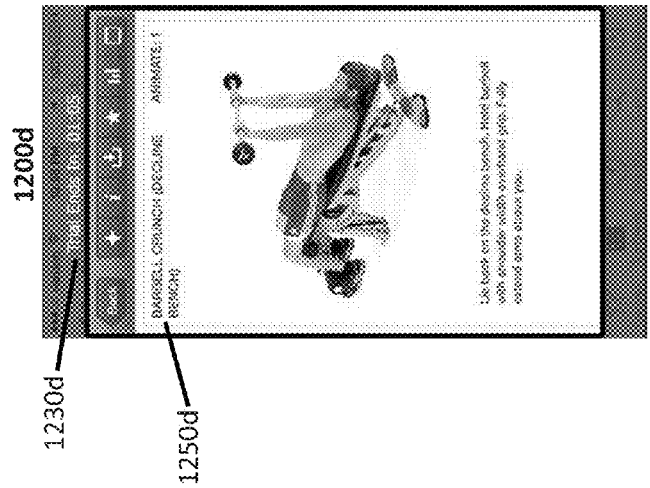
Figure 12C:
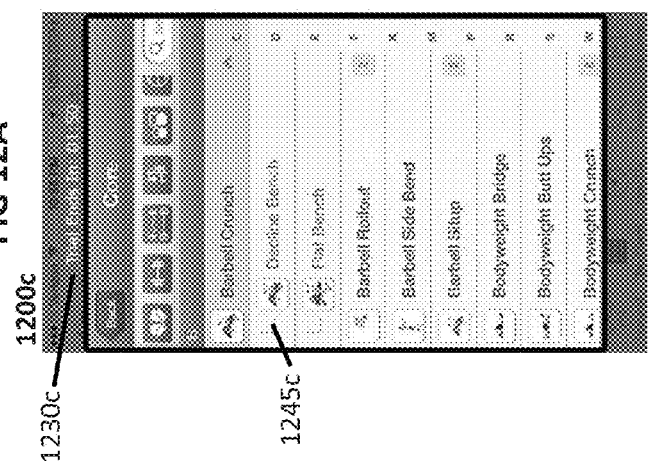
Figure 12B:
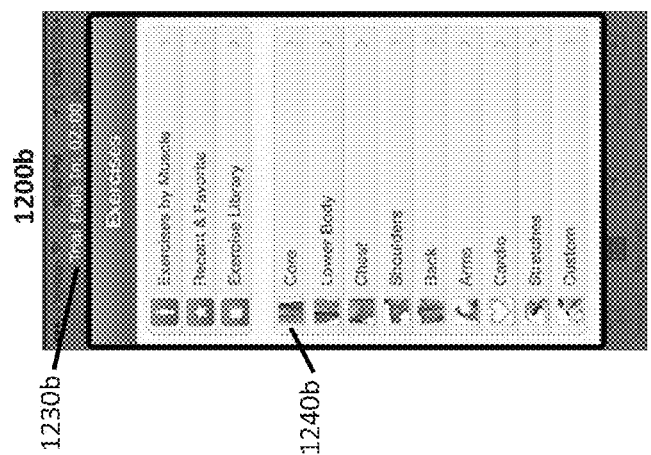

FIG. 12*a* illustrates an example "app store" screen 1200*a* that, in this embodiment, is generated by a native "app store" app on a user's mobile device. One of the items a user encounters on screen 1200*a* is a description 1210*a* of a "Fitness Buddy" mobile app available on the app store, which enables users to browse through groups of exercises and view animations and videos of selected exercises. The user is presented with an "Install" button 1220*a* offering the standard option to download and install the Fitness Buddy mobile app on the user's mobile device (whether offered "free" or for purchase).

In this embodiment, an additional "Try" button 1225*a* is provided (not currently a standard app store feature), offering the user the option to demo a fully functional version of the Fitness Buddy (or other selected) mobile app on a trial basis (e.g., for a limited period of time). Of course, in other embodiments, additional limitations on mobile app functionality can be enforced.

Upon clicking on button 1225*a*, a Fitness Buddy screen (1200*b* in FIG. 12*b*) is displayed, which includes a "timer" 1230*b* indicating the amount of time remaining in the trial. Upon browsing screen 1200*b*, the user selects the "Core" category 1240*b* of exercises, which results in the display of screen 1200*c* in FIG. 12*c*, which includes (in addition to updated "timer" 1230*c*) additional groups of exercises in that "Core" category. Through additional interaction with screen 1200*c*, the user eventually selects the Barbell Crunch "Decline Bench" exercise 1245*c*, which results in the display of screen 1200*d* in FIG. 12*d*, which includes (in addition to updated "timer" 1230*d*) a button 1250*d* to display an animation of this exercise.

Eventually, time will expire (not shown) and the trial will terminate. As noted above, a key advantage of this "App Store Trial" scenario is the ability of the app store provider to offer users trial versions of any mobile app available in the app store, without requiring users to download and install the mobile app, and with little or no effort required on the part of mobile app developers.

Figure 13C:
FIGS. 13A-13D are annotated screenshots of embodiments of various use-case scenarios of the present invention.
Figure 13D:
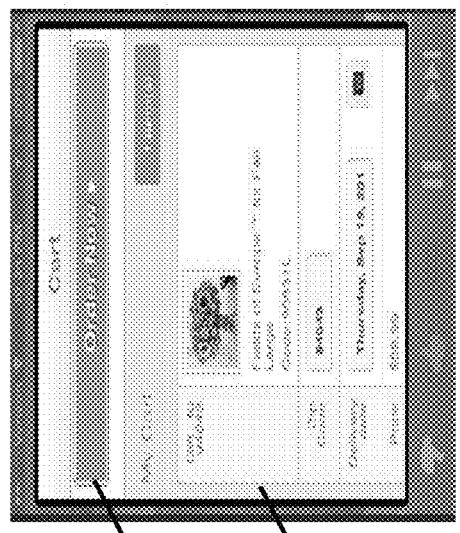
Figure 13B:
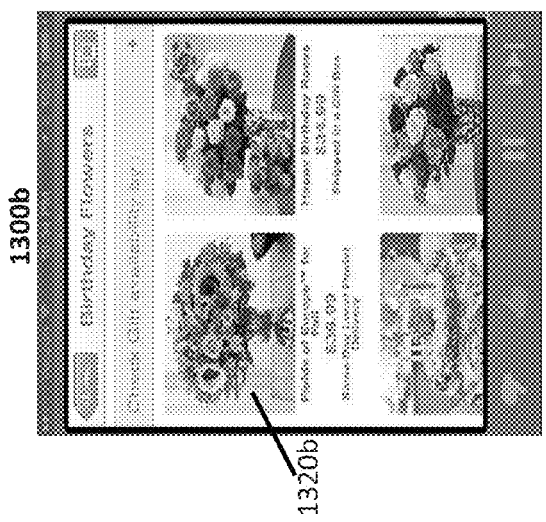
Figure 13A:
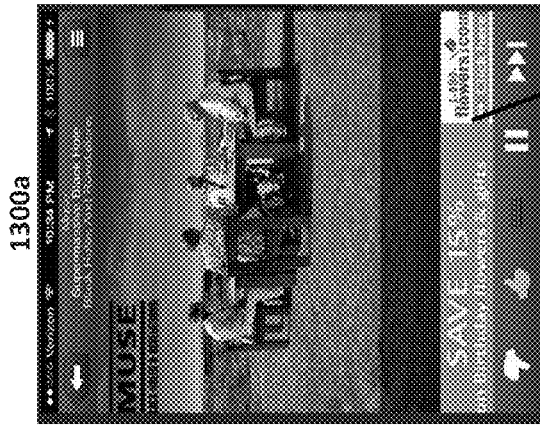

Another novel scenario enabled by mobile app remote virtualization system 100 is the "Transaction" scenario, illustrated in FIGS. 13*a-13d*, which enables users to complete commercial transactions with a full-featured mobile app, without ever downloading and installing that mobile app. FIG. 13*a* illustrates a native mobile app 1300*a*, the popular Pandora music-playing app. A user running native app 1300*a* might eventually encounter a mobile ad 1310*a* for "1-800-Flowers.com," a commercial flower vendor that has developed a mobile app (in addition to their website) to enable users to purchase flowers.

In this scenario, the user may have an immediate need to purchase flowers (e.g., for a friend or relative's birthday), but may not have a sufficiently frequent need to justify downloading and installing their app. Moreover, the app might not be available for the user's mobile device platform, and the user might only realize the need to purchase flowers upon viewing mobile ad 1310*a*.

In any event, upon clicking mobile ad 1310*a*, the virtual app is launched and screen 1300*b* in FIG. 13*b* is displayed (either initially, or after some user interaction with an initial screen). The user eventually identifies and selects a desired flower arrangement 1320*b*, which results in the display of screen 1300*c* in FIG. 13*c*, illustrating a more detailed description of the selected flower arrangement. Upon selecting item 1325*c* on screen 1300*c*, a "shopping cart" screen (1300*d* in FIG. 13*d*) is displayed, which allows the user to enter relevant purchase information 1340*d* and complete the transaction by selecting "Order Now" button 1350*d*.

Thus, instead of downloading and installing the mobile app, or linking to a website not designed for a mobile device, the user is able to immediately launch a virtual app with the full functionality of the corresponding mobile app, and complete the commercial transaction—in this case, purchasing a flower arrangement. In one embodiment, the mobile app requires access to data on the user's mobile device (e.g., name and shipping address) which might require opening another native app (e.g., the user's "address book" native app). Such functionality is offered by the virtual app due to the capabilities described above in greater detail with reference to FIGS. 4-9.

Another common situation is the "Business Security" scenario, illustrated in FIGS. 14*a-d*, which involves the desire of companies to protect valuable business data by restricting employees' use of "company apps" on their personal mobile devices. For example, even when employees are permitted to run company apps on their personal mobile devices, such apps typically include a layer of security to address situations in which an employee loses his phone or other mobile device, or is terminated. In such situation, the company's servers typically communicate with the employees' phone to erase the company apps and all relevant data (even if otherwise encrypted). However, in many cases, the employees' mobile device is not accessible, for example, over the Internet (dead battery, out of range, etc.), leaving even encrypted data vulnerable to attack.

Figure 14A:
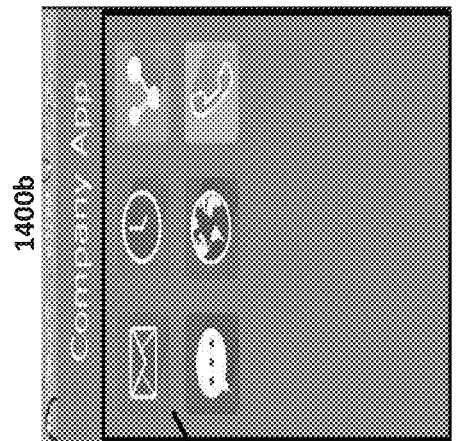
FIGS. 14A-14D are annotated screenshots of embodiments of various use-case scenarios of the present invention.
Figure 14B:
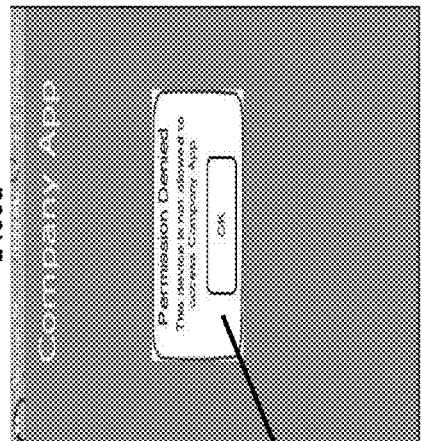

To address this problem, FIG. 14*a* illustrates a screen 1400*a* displaying the "mobile desktop" of an employees' mobile device, including an icon 1410*a* for launching a virtual app that is effectively a container for additional virtual apps—i.e., the "company apps." Upon selecting icon 1410*a* (the virtual app container), a screen (1400*b* in FIG. 14*b*) is displayed, including a set of icons 1420*b* representing virtual apps corresponding to the individual company apps.

The employee can launch any of these virtual apps displayed on screen 1400*b* with full functionality, and without ever downloading and installing any of the native company apps on the employee's mobile device. In this scenario, icon 1410*a* represents a SHELL APP 124*b* (FIG.

1), including Virtual App SDK 125 and Virtual App IDs 126 representing each virtual company app.

Figure 14C:
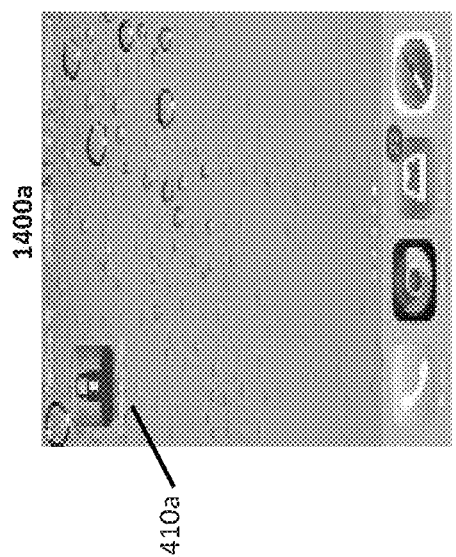
Figure 14D:
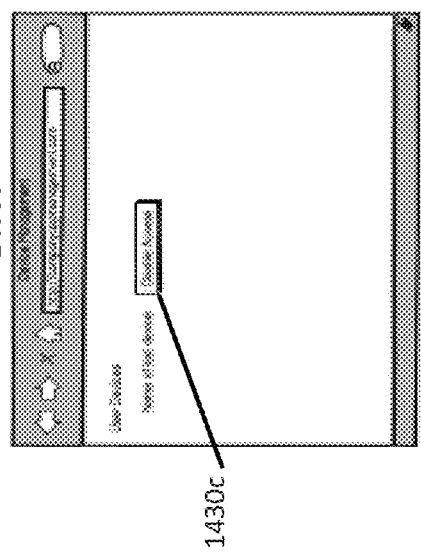

Moreover, in one embodiment, all secure company data utilized during execution of these company apps is stored on the company's server, and is thus not vulnerable even if the employee loses his phone or is terminated. Should such an event occur, the employee or an administrator at the company would typically attempt to "disable" the employee's access to the company apps. FIG. 14c illustrates one embodiment in which a web page 1400c is utilized to identify the employee and disable his access to the company apps by selecting "Disable Access" button 1430c.

As noted above, web page 1400c, if employed outside the context of the present invention, would attempt to erase the company apps natively installed on the employee's mobile device. In the context of the present invention, however, no such measures are necessary. The employee's access is merely disabled on the company's server. Should the employee (or anyone else) attempt to access the virtual company apps, the company's server would prevent such access and display a screen on the employee's mobile device, such as screen 1400d in FIG. 14d, including a "Permission Denied" message 1450d that explains that the employee's access to the company apps is not authorized. In other embodiments, access to individual company apps, or even features within a company app, could be restricted in a similar manner.

FIGS. 15a-b illustrate virtualization of a "Deep Linking" scenario in which a mobile app, if natively installed, can be launched into a particular "context" analogous to a "deep link" to a particular page of a website. For example, if a user has a native version of the "LinkedIn" mobile app installed on his mobile device, and then selects a link (e.g., from a mobile web browser), the LinkedIn app will be launched to a particular location in the app (e.g., as if the user had launched LinkedIn and searched for a particular person).

FIG. 15a illustrates a web page 1500a including a search box 1510a into which a user has entered a search for a particular person, along with the search term, "linkedin." The search results displayed on web page 1500a include an entry 1520a linking to that person's LinkedIn bio. As noted above, if the user had a native version of the LinkedIn app installed on his mobile device, then selecting entry 1520a would launch the LinkedIn app to the location corresponding to entry 1520a.

In the scenario illustrated in FIGS. 15a-b, however, the user does not have a native version of LinkedIn installed on his mobile device, and instead has only a virtual app on his mobile device, which corresponds to the LinkedIn mobile app installed in SERVER Environment 100 (FIG. 1). Nevertheless, once the user selects entry 1520a, screen 1500b in FIG. 15b is displayed, which is equivalent to the screen that would be displayed by the native LinkedIn app. In fact, the LinkedIn mobile app installed in SERVER Environment 100 effectively generates screen 1500b, which includes LinkedIn app controls 1530b, and displays the LinkedIn entry 1550b corresponding to search result entry 1520a.

In other words, upon selecting entry 1520a, the mobile web browser, via the mobile OS on the user's mobile device, issues a command attempting to launch the LinkedIn app. In one embodiment, Virtual App SDK 125 intercepts this command and instead launches the virtual app (and corresponding LinkedIn app in SERVER Environment 100) in a manner similar to that discussed above. Note that certain mobile OS commands can be intercepted and implemented locally by Virtual App SDK 125, while others require the assistance of Remote API Listener/Dispatcher 430 as discussed above with reference to FIG. 9.

Figure 16C:
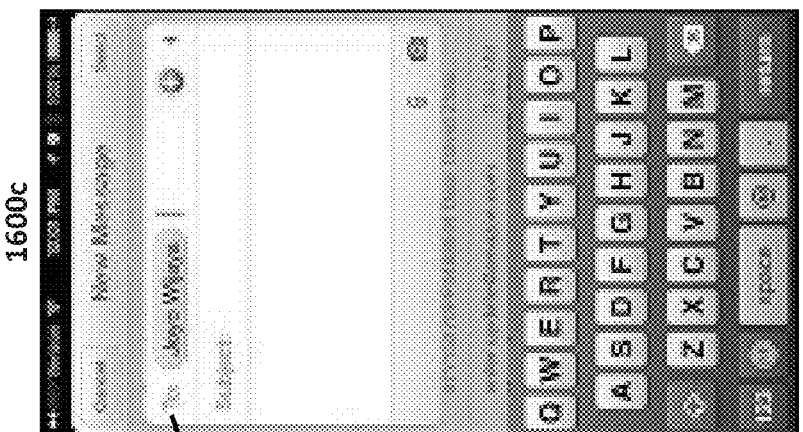
FIGS. 16A-16C are annotated screenshots of embodiments of various use-case scenarios of the present invention.
Figure 16B:
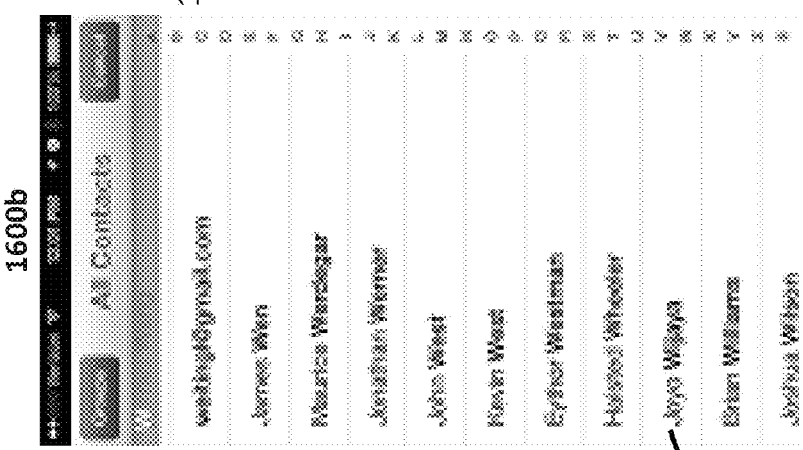
Figure 16A:
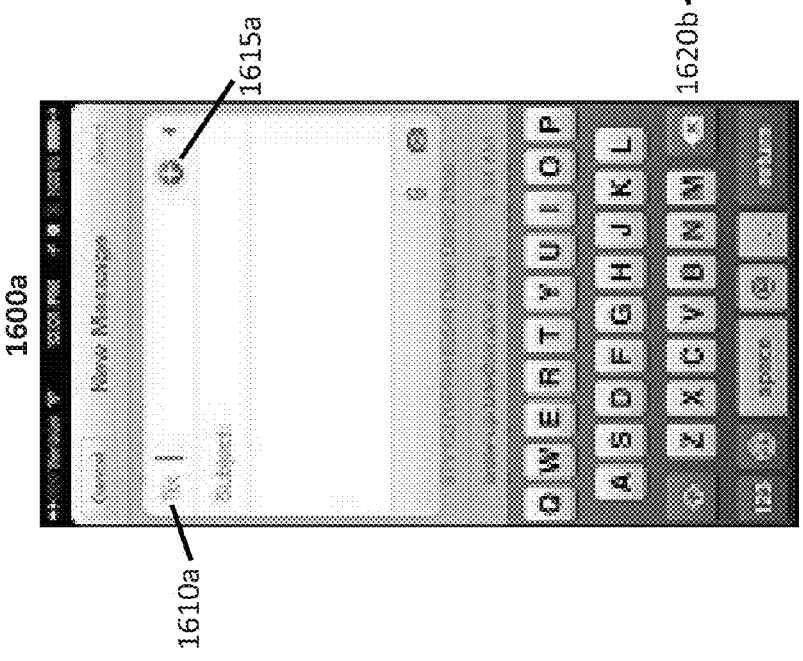

FIGS. 16a-16c illustrate an "App-Initiated Data Request" Scenario in which a virtual app (e.g., an email app) requires data from another native app (e.g., an Address Book app) installed on the user's mobile device. A native email app could, with the assistance of the local mobile OS, launch the Address Book app, obtain the necessary data (e.g., an intended recipient's email address), and return that data to the native email app (e.g., to fill in the addressee field of an email being composed).

However, if the email app is installed only in SERVER Environment 101, then it does not have direct access to the Address Book app and local data stored on the user's remote mobile device. As noted above, this "app-initiated event" problem is addressed by the present invention as described, for example, with reference to FIGS. 8 and 9.

Turning to FIG. 16a, which illustrates a screen 1600a of a virtual email app, the user attempts to fill in addressee "To" field 1610a by selecting "+" button 1615a, which is intended to launch the Address Book app. As described in greater detail above, Remote API Listener/Dispatcher 430 intercepts this request for an app-initiated event and forwards it to Virtual App SDK 125 for processing by the mobile OS in the user's mobile device.

As a result, the native Address Book app is launched on the user's mobile device, and screen 1600b of FIG. 16b is displayed, including the user's desired Address Book entry 1620b. Upon selecting entry 1620b, the native Address Book app returns this data to the local mobile OS, which notifies the email app with a "callback" to obtain this data. In one embodiment, Virtual App SDK 125 intercepts this notification and executes the "callback" to obtain the data locally from the mobile OS. In other embodiments, this notification is forwarded to the mobile app in SERVER Environment 101, which requests this data, whereupon Remote API Listener/Dispatcher 430 intercepts this request and forwards it back to Virtual App SDK 125 for local implementation. In either case, Virtual App SDK 125 eventually obtains this data and forwards it back to the email app running in SERVER Environment 101, so that it can display the selected "To" entry in its addressee field.

Thus, once the user selects entry 1620b, and the email app running in SERVER Environment 101 receives this data from the user's local Address Book, the virtual email app renders screen 1600c in FIG. 16c, which now includes the desired addressee's email address in "To" field 1630c.

In some situations, the mobile app remote virtualization system 100 of the present invention enables scenarios that are not otherwise possible, even with native versions of mobile apps. For example, the "Multiple Client Device" scenario illustrated in FIGS. 17a-b addresses the situation in which multiple users desire to simultaneously control a "session" with a mobile app that, in this scenario, is not natively installed on the mobile device of any of the users. For example, FIG. 17a illustrates two remote mobile devices, an iPhone 1710a, displaying a virtual app 1715a (e.g., the Keynote app) and an Android phone 1720a, displaying the same session of that virtual app 1725a on its screen. In one embodiment, the iPhone 1710a is the only device capable of controlling the Keynote app (e.g., issuing touch commands), while in other embodiments, both the iPhone 1710a and the Android phone 1720a are capable of simultaneously controlling the native Keynote app (running in SERVER Environment 101).

Figure 17B:
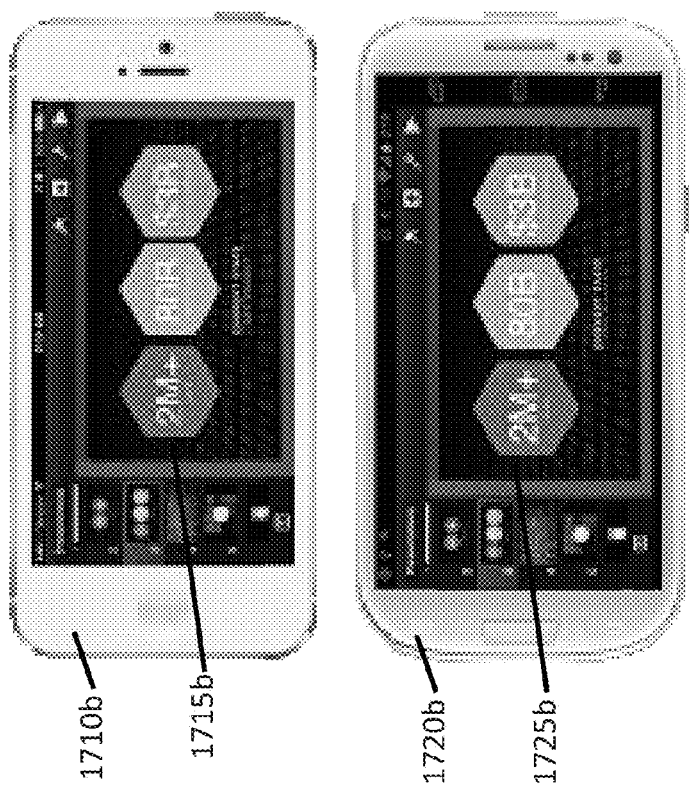
FIGS. 17A-17B are annotated screenshots of embodiments of various use-case scenarios of the present invention.
Figure 17A:
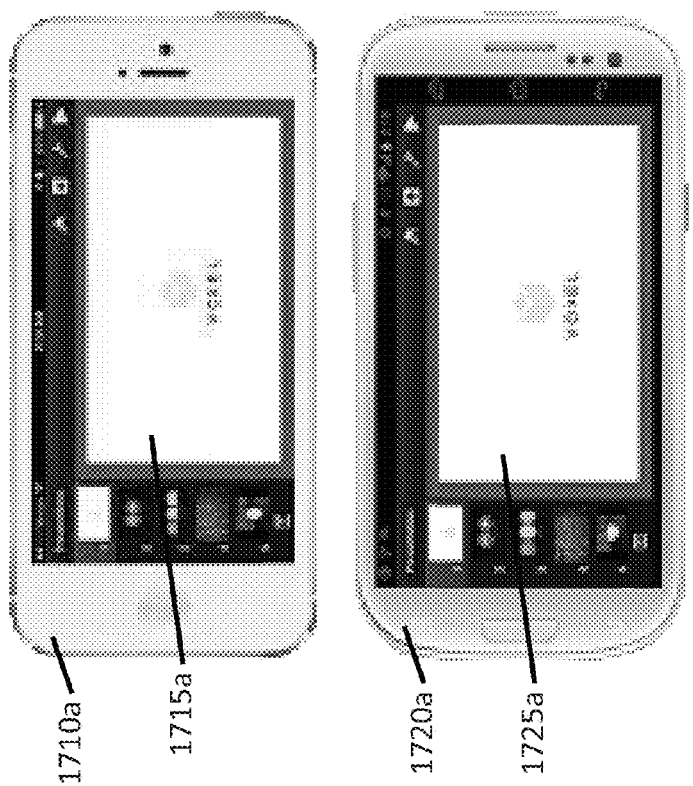

In any event, once the user of iPhone 1710a interacts with the Keynote app, screen 1715b of FIG. 17b is displayed on iPhone 1710*b* (as a result of the delivery of audio and video streams by AV Streamer 416 in App Communicator 400, as described in detail above). In this scenario, however, the same audio and video streams are simultaneously delivered to and rendered on screen 1725*b* of Android phone 1720*b*. Thus, both remote client devices are part of the same "session" and receive identical screen displays, an extremely useful mechanism for enabling multiple users to view and/or control the same "session" of a virtual mobile app that is not installed on the mobile device of any of the users.

Finally, another example of an otherwise impossible scenario (the "App Fast Forward" scenario) is illustrated in FIGS. 18*a-d*, which addresses situations in which a virtual app is launched and execution is automatically "fast-forwarded" to a desired point in the runtime execution of the virtual app (even though such a "fast-forwarding" feature does not exist in the native version of the mobile app).

For example, FIG. 18*a* illustrates a screen 1800*a* of a native app ("TweeJump") running on a user's mobile device. As was the case with other scenarios described above (e.g., the "Try Before You Buy" scenario in FIGS. 10*a-c*), the user might eventually encounter a mobile advertisement 1810*b* (FIG. 18*b*) on the screen 1800*b* of the native TweeJump app. Mobile ad 1810*b* includes a "Play Instantly" button 1815*b*, in this case to launch the advertised virtual app, entitled "Cut the Rope."

Normally, however, when the native version of the "Cut the Rope" app is launched, the initial screen 1800*d* (FIG. 18*d*) is displayed. However, due to the "fast forwarding" feature implemented in App Communicator 228 (FIG. 2*a*), in concert with Mobile VM 225, the execution of the "Cut the Rope" app running on Mobile VM 225 is "fast-forwarded" to a different point in its runtime execution (e.g., by providing it with artificial user-initiated events, such as keystrokes, touch events, etc.). In one embodiment, such artificial events are "recorded" from a prior session of the virtual app, while in other embodiments such artificial events are generated for the purpose of rendering a particular point in the app's execution (e.g., an advanced level of a game).

In any event, upon selecting "Play Instantly" button 1815*b*, screen 1800*c* of FIG. 18*c* is displayed on the user's mobile device (rather than the initial screen 1800*d* of the Cut the Rope app), including a "timer" 1820*c* if a limited trial period is desired. Once the time expires, a message 1825*d* of FIG. 18*d* can be displayed on screen 1800*d*, prompting the user, for example, to install the native version of the app if he wants to keep playing.

It should be noted that there are many useful applications of this "App Fast Forward" scenario. For example, by saving the "state" of prior app sessions, users could be returned to a particular point in an app (e.g., a game), even though the native version of the app does not support saving state at a desired level of granularity (e.g., in between levels of a game). Moreover, the "state" to which the virtual app is "fast-forwarded" could be tied to a user's interaction with a mobile app, a website or practically any other external resource. In short, the scenarios in which a developer might desire to permit certain users to "fast forward" to a particular point in the runtime execution of their mobile apps is virtually limitless.

The present invention has been described herein with reference to specific embodiments as illustrated in the accompanying drawings. Many variations of the embodiments of the functional components and dynamic operation (including use-case scenarios) of mobile app remote virtualization system 100 described above will be apparent to those skilled in the art without departing from the spirit of the present invention, including but not limited to embodiments of virtual apps that support requests by their corresponding server-side app for app-initiated events requiring access to local resources on a user's client device.

The invention claimed is:

1. A remote virtualization system for running, on a host server platform, host applications that are controlled over a network by virtual applications running on a remote client device, the remote client device including a native operating system, the remote virtualization system comprising:
    (a) a host application that runs on the host server platform;
    (b) a virtual application that runs on the remote client device to control the execution of the host application on the host server platform;
    (c) a capture engine on the remote client device that intercepts user-initiated events, resulting from a user's interaction with the virtual application on the remote client device, and transmits the user-initiated events over the network to the host application;
    (d) an AV streamer on the host server platform that streams, to the virtual application over the network, screen displays and associated audio generated by the host application in response to the user-initiated events; and
    (e) a remote API listener/dispatcher on the host server platform that (i) intercepts requests from the host application for application-initiated events, (ii) determines whether a requested application-initiated event requires access to local resources on the remote client device, and, if so, (iii) transmits that application-initiated event over the network to the virtual application, which submits that application-initiated event to the native operating system on the remote client device to access the local resources.

2. The remote virtualization system of 1, wherein the host application runs on a physical mobile device on the host server platform.

3. The remote virtualization system of 1, wherein the user-initiated events are translated into a normalized format.

4. The remote virtualization system of 1, wherein the virtual application is embedded in a native application on the remote client device.

5. The remote virtualization system of 1, wherein the virtual application is embodied in a standalone shell application container on the remote client device.

6. The remote virtualization system of 5, wherein the standalone shell application container includes a plurality of virtual applications.

7. The remote virtualization system of 1, wherein an intercepted request includes invocation of a native application on the remote client device.

8. The remote virtualization system of 7, wherein data obtained from running the native application on the remote client device are returned to and utilized by the host application running on the host server platform.

9. The remote virtualization system of 7, wherein the user is authenticated automatically upon invocation of the native application.

10. The remote virtualization system of 1, wherein multiple instances of the virtual application run concurrently on the remote client device.

11. The remote virtualization system of 1, wherein the local resources include data generated by local hardware on the remote mobile device.

12. The remote virtualization system of 11, wherein the local hardware includes GPS, gyroscope or accelerometer hardware.

13. The remote virtualization system of 11, wherein the local hardware includes camera, microphone, speaker or network hardware.

14. The remote virtualization system of 1, wherein the host application is preloaded on the host server platform to reduce perceived application loading time after the virtual application is invoked.

15. The remote virtualization system of 1, wherein parameters for the encoding and streaming of the screen displays and associated audio are adjusted dynamically, based on current network conditions or capabilities of the remote client device.

16. The remote virtualization system of 1, wherein the screen displays and associated audio are transmitted to a remote physical device in addition to the remote client device, and wherein the remote physical device is a smartphone, tablet or television.

17. The remote virtualization system of 16, wherein the remote physical device includes a virtual application that runs on the remote client device and concurrently controls the execution of the host application on the host server platform.

18. The remote virtualization system of 1, wherein the virtual application performs the following actions when a link to a native version of the host application is invoked on the remote client device:
  (a) determining whether the native version of the host application is installed on the remote client device,
  (b) launching the native version of the host application on the host server platform if the native version of the host application is not installed on the remote client device, and
  (c) launching the native version of the host application on the remote client device if the native version of the host application is installed on the remote client device.

19. The remote virtualization system of 18, wherein the link is a deep link that results in the execution of the launched application, whether launched on the remote client device or the host server platform, being transferred to a location in the launched application associated with the deep link.

20. A method for running, on a host server platform, host applications that are controlled over a network by virtual applications running on a remote client device, the remote client device including a native operating system, the method comprising the following steps:
  (a) running a host application on the host server platform;
  (b) running a virtual application on the remote client device to control the execution of the host application on the host server platform;
  (c) intercepting user-initiated events, resulting from a user's interaction with the virtual application on the remote client device, and transmitting the user-initiated events over the network to the host application;
  (d) streaming screen displays and associated audio over the network to the virtual application, wherein the screen displays and associated audio are generated by the host application in response to the user-initiated events;
  (e) intercepting requests from the host application for application-initiated events;
  (f) determining whether a requested application-initiated event requires access to local resources on the remote client device; and, if so;
  (g) transmitting that application-initiated event over the network to the virtual application, which submits that application-initiated event to the native operating system on the remote client device to access the local resources.

21. The method of 20, wherein the host application runs on a physical mobile device on the host server platform.

22. The method of 20, wherein the user-initiated events are translated into a normalized format.

23. The method of 20, wherein the virtual application is embedded in a native application on the remote client device.

24. The method of 20, wherein the virtual application is embodied in a standalone shell application container on the remote client device.

25. The method of 24, wherein the standalone shell application container includes a plurality of virtual applications.

26. The method of 20, wherein an intercepted request includes invocation of a native application on the remote client device.

27. The method of 26, wherein data obtained from running the native application on the remote client device are returned to and utilized by the host application running on the host server platform.

28. The method of 26, wherein the user is authenticated automatically upon invocation of the native application.

29. The method of 20, wherein multiple instances of the virtual application run concurrently on the remote client device.

30. The method of 20, wherein the local resources include data generated by local hardware on the remote mobile device.

31. The method of 30, wherein the local hardware includes GPS, gyroscope or accelerometer hardware.

32. The method of 30, wherein the local hardware includes camera, microphone, speaker or network hardware.

33. The method of 20, wherein the host application is preloaded on the host server platform to reduce perceived application loading time after the virtual application is invoked.

34. The method of 20, wherein parameters for the encoding and streaming of the screen displays and associated audio are adjusted dynamically, based on current network conditions or capabilities of the remote client device.

35. The method of 20, wherein the screen displays and associated audio are transmitted to a remote physical device in addition to the remote client device, and wherein the remote physical device is a smartphone, tablet or television.

36. The method of 35, wherein the remote physical device includes a virtual application that runs on the remote client device and concurrently controls the execution of the host application on the host server platform.

37. The method of 20, further comprising the following steps when a link to a native version of the host application is invoked on the remote client device:
  (a) determining whether the native version of the host application is installed on the remote client device,
  (b) launching the native version of the host application on the host server platform if the native version of the host application is not installed on the remote client device, and
  (c) launching the native version of the host application on the remote client device if the native version of the host application is installed on the remote client device.

38. The method of 37, wherein the link is a deep link that results in the execution of the launched application, whether launched on the remote client device or the host server platform, being transferred to a location in the launched application associated with the deep link.

* * * * *